US007065873B2

(12) United States Patent
Kang et al.

(10) Patent No.: US 7,065,873 B2
(45) Date of Patent: Jun. 27, 2006

(54) RECUPERATOR ASSEMBLY AND PROCEDURES

(75) Inventors: Yungmo Kang, La Canada Flintridge, CA (US); Robert D. McKeirnan, Jr., Westlake Village, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 39 days.

(21) Appl. No.: 10/917,118

(22) Filed: Aug. 12, 2004

(65) Prior Publication Data

US 2005/0098309 A1 May 12, 2005

Related U.S. Application Data

(60) Provisional application No. 60/559,270, filed on Apr. 2, 2004, provisional application No. 60/515,080, filed on Oct. 28, 2003.

(51) Int. Cl.
*B23P 15/26* (2006.01)
*F28F 3/12* (2006.01)

(52) U.S. Cl. .................. 29/890.039; 165/166; 165/906

(58) Field of Classification Search ................ 165/165, 165/166, 167, 170, 906; 29/890.039
See application file for complete search history.

(56) References Cited

U.S. PATENT DOCUMENTS

| | | | | |
|---|---|---|---|---|
| 1,662,870 A | | 3/1928 | Stancliffe | |
| 1,825,498 A | | 9/1931 | Wogan | |
| 2,429,508 A | | 10/1947 | Belaieff | 257/139 |
| 2,458,159 A | | 1/1949 | Goldthwaite | 257/137 |
| 2,594,761 A | | 4/1952 | Fletcher et al. | 257/226 |
| 2,643,512 A | | 6/1953 | Stalker | 60/39.16 |
| 2,650,073 A | | 8/1953 | Holm | 257/6 |
| 2,792,200 A | | 5/1957 | Huggins et al. | 257/246 |
| 2,812,165 A | | 11/1957 | Hammond | 257/245 |
| 2,925,714 A | | 2/1960 | Cook | 60/39.16 |
| 2,978,226 A | | 4/1961 | White | 257/224 |
| 3,033,534 A | | 5/1962 | Caughill et al. | 257/235 |
| 3,201,108 A | | 8/1965 | Kramer | 266/36 |
| 3,216,495 A | | 11/1965 | Johnson | 165/166 |
| 3,224,502 A | | 12/1965 | Wallace | 165/82 |
| 3,228,464 A | | 1/1966 | Stein et al. | 165/166 |
| 3,473,604 A | * | 10/1969 | Tiefenbacher | 165/166 |
| 3,507,115 A | | 4/1970 | Wisoka | 60/39.51 |
| 3,741,293 A | | 6/1973 | Haberski | 165/166 |
| 3,759,323 A | | 9/1973 | Dawson et al. | 165/166 |
| 3,814,171 A | | 6/1974 | Nakamura et al. | 165/10 |

(Continued)

FOREIGN PATENT DOCUMENTS

| | | |
|---|---|---|
| CA | 641.574 | 5/1962 |

(Continued)

OTHER PUBLICATIONS

McDonald "Gas Turbine Recuperator Technology Advancements" Inst. Materials Conf. on Materials Issues in Heat Exchangers and Boilers, Loughborough, UK, Oct. 17, 1995.

(Continued)

*Primary Examiner*—Leonard R. Leo
(74) *Attorney, Agent, or Firm*—Waddey & Patterson, P.C.; Lucian Wayne Beavers

(57) ABSTRACT

A construction of recuperator core segments is provided which insures proper assembly of the components of the recuperator core segment, and of a plurality of recuperator core segments. Each recuperator core segment must be constructed so as to prevent nesting of fin folds of the adjacent heat exchanger foils of the recuperator core segment. A plurality of recuperator core segments must be assembled together so as to prevent nesting of adjacent fin folds of adjacent recuperator core segments.

8 Claims, 15 Drawing Sheets

U.S. PATENT DOCUMENTS

| | | | | | |
|---|---|---|---|---|---|
| 3,818,984 | A | | 6/1974 | Nakamura et al. | 165/166 |
| 3,831,374 | A | | 8/1974 | Nicita | 60/39.51 |
| 3,889,744 | A | | 6/1975 | Hill et al. | 165/83 |
| 4,022,050 | A | | 5/1977 | Davis et al. | 72/379 |
| 4,031,953 | A | | 6/1977 | Kline | 165/166 |
| 4,049,051 | A | | 9/1977 | Parker | 165/166 |
| 4,072,327 | A | | 2/1978 | Young | 285/137 |
| 4,073,340 | A | | 2/1978 | Parker | 165/166 |
| 4,098,330 | A | | 7/1978 | Flower et al. | 165/166 |
| 4,183,403 | A | | 1/1980 | Nicholson | 165/166 |
| 4,229,868 | A | | 10/1980 | Kretzinger | 29/157.3 |
| 4,249,595 | A | | 2/1981 | Butt | 165/110 |
| 4,331,352 | A | | 5/1982 | Graves | 285/226 |
| 4,338,998 | A | | 7/1982 | Goloff | 165/165 |
| 4,352,393 | A | | 10/1982 | Vidal-Meza | 165/166 |
| 4,438,809 | A | | 3/1984 | Papis | 165/166 |
| 4,474,000 | A | | 10/1984 | Benson et al. | 60/39.511 |
| 4,690,206 | A | | 9/1987 | Bein | 165/81 |
| 4,699,209 | A | * | 10/1987 | Thorogood | 165/166 |
| 4,974,413 | A | | 12/1990 | Szego | 60/39.511 |
| 5,004,044 | A | | 4/1991 | Horgan et al. | 165/145 |
| 5,050,668 | A | | 9/1991 | Peterson et al. | 165/81 |
| 5,060,721 | A | | 10/1991 | Darragh | 165/165 |
| 5,065,816 | A | | 11/1991 | Darragh | 165/125 |
| 5,081,834 | A | | 1/1992 | Darragh | 60/39.511 |
| 5,082,050 | A | | 1/1992 | Darragh | 165/81 |
| 5,105,617 | A | | 4/1992 | Malohn | 60/39.511 |
| 5,279,358 | A | | 1/1994 | Hannis | 165/103 |
| 5,323,603 | A | | 6/1994 | Malohn | 60/39.07 |
| 5,333,482 | A | | 8/1994 | Dunlap et al. | 72/307 |
| 5,388,398 | A | | 2/1995 | Kadambi et al. | 60/39.511 |
| 5,555,933 | A | | 9/1996 | Darragh et al. | 165/166 |
| 5,694,803 | A | | 12/1997 | Ervin et al. | 72/385 |
| 5,699,856 | A | | 12/1997 | Merle | 165/166 |
| 5,855,112 | A | | 1/1999 | Bannai et al. | 60/39.511 |
| 5,918,368 | A | | 7/1999 | Ervin et al. | 29/890.03 |
| 5,954,128 | A | | 9/1999 | Harkins et al. | 165/173 |
| 6,032,730 | A | | 3/2000 | Akita et al. | 165/166 |
| 6,066,898 | A | | 5/2000 | Jensen | 290/52 |
| 6,112,403 | A | | 9/2000 | Ervin et al. | 29/726 |
| 6,158,121 | A | | 12/2000 | Ervin et al. | 29/890.034 |
| 6,293,338 | B1 | | 9/2001 | Chapman et al. | 165/166 |
| 6,308,409 | B1 | | 10/2001 | Bucey et al. | 29/890.034 |
| 6,460,613 | B1 | | 10/2002 | Nash et al. | 165/153 |
| 2003/0088982 | A1 | | 5/2003 | Ervin et al. | 29/890.034 |

FOREIGN PATENT DOCUMENTS

| | | |
|---|---|---|
| CH | 460831 | 10/1968 |
| DE | 30 01 568 | 7/1981 |
| EP | 0 077 656 | 4/1983 |
| FR | 1.211.918 | 3/1960 |
| GB | 715491 | 9/1954 |
| GB | 843965 | 8/1960 |
| GB | 892962 | 4/1962 |
| GB | 1539035 | 1/1979 |
| GB | 2 094 172 | 9/1982 |
| GB | 2 217 828 | 11/1989 |
| JP | 61086594 | 5/1986 |
| JP | 61086596 | 5/1986 |
| WO | WO 82/02940 | 9/1982 |

OTHER PUBLICATIONS

McDonald "Recuperator Technology Evolution for Microturbines" ASME Turbo Expo 2002, Amsterdam, The Netherlands, Jun. 3-6, 2002.

Ward and Holman "Primary Surface Recuperator for High Performance Prime Movers" SAE Paper No. 920150 (1992).

Parsons "Development, Fabrication and Application of a Primary Surface Gas Turbine Recuperator" SAE Paper No. 851254 (1985).

* cited by examiner

RECUPERATOR ASSEMBLY AND PROCEDURES

This application is a Non-Provisional Utility application which claims benefit of co-pending U.S. Provisional Patent Application Ser. No. 60/515,080 filed Oct. 28, 2003, entitled "Recuperator Construction for a Gas Turbine Engine", and U.S. Provisional Patent Application Ser. No. 60/559,270, filed Apr. 2, 2004, entitled "Recuperator Construction for a Gas Turbine Engine", both of which are hereby incorporated by reference.

This invention was made in conjunction with the US Department of Energy's Advanced Microturbine System Project under contract number DE-FC02-00CH11058. The United States government may have certain rights in this invention.

BACKGROUND OF THE INVENTION

1. Field of the Invention

The present invention relates generally to recuperators for gas turbine engines. More particularly, the present invention relates to component construction and assembly procedures designed to provide for foolproof assembly of the recuperator core.

2. Description of the Prior Art

Microturbines are small gas turbines used for small-scale power generation at one point in a distributed network or at a remote location. These power sources typically have rated power outputs of between 25 kW and 500 kW. Relative to other technologies for small-scale power generation, microturbines offer a number of advantages, including: a small number of moving parts, compact size, light weight, greater efficiency, lower emissions, lower electricity costs, potential for low cost mass production, and opportunities to utilize waste fuels.

Recuperator technology allows microturbines to achieve substantial gains in power conversion efficiencies. A conventional microturbine achieves at most 20 percent efficiency without a recuperator. However, with a recuperator, the efficiency of microturbine power conversion efficiency improves to between 30 percent and 40 percent, depending on the recuperator's effectiveness. This increase in efficiency is essential to acceptance of microturbine technology in certain markets and to successful market competition with conventional gas turbines and reciprocating engines.

Capstone Turbine Corp., the assignee of the present invention, has employed annular recuperators in 30 kW microturbines. These 30 kW microturbine engines are described in Treece and McKeirnan, "Microturbine Recuperator Manufacturing and Operating Experience," ASME paper GT-2002-30404 (2002), the details of which are incorporated herein by reference. Capstone has also developed and marketed 60 kW microturbines having similar annular recuperators. Commercial operating experience with Capstone's 30 kW and 60 kW microturbines has shown that annular recuperators perform well in these microturbines. The annular recuperators are more resilient to thermal cycling and have less total pressure drop as compared to box-type recuperators.

FIG. 1 shows the schematic diagram of a prototypical Capstone Microturbine. The airflow enters and exits the recuperator in a radial direction and the gas flows in an axial direction of the engine. The construction of the individual recuperator core segments of the C30 and C60 microturbines previously sold by the assignee of the present invention have included a pair of sheets of fin fold stainless steel material assembled with a plurality of spacer bars located between the sheets of material and including external stiffener bars, all of which are welded together in a suitable arrangement and have assembled therewith corrugated air inlet and outlet manifold inserts and gas side manifold inserts.

U.S. Pat. Nos. 6,112,403; 6,158,121; and 6,308,409 disclose recuperator core segments similar to those previously used by Capstone.

Other general background information on the state of the art of recuperator design for gas microturbines is found in the following: (1) McDonald "Gas Turbine Recuperator Technology Advancements", presented at the Institute of Materials Conference on Materials Issues in Heat Exchangers and Boilers, Loughborough, UK, Oct. 17, 1995; (2) McDonald, "Recuperator Technology Evolution for Microturbines", present at the ASME Turbo Expo 2002, Amsterdam, the Netherlands, Jun. 3–6, 2002; (3) "Ward and Holman", "Primary Surface Recuperator for High Performance Prime Movers", SAE paper number 920150 (1992); and (4) Parsons, "Development, Fabrication and Application of a Primary Surface Gas Turbine Recuperator", SAE paper 851254 (1985).

As a part of the US Department of Energy's Advanced Microturbine System (AMTS) Project, the assignee of the present invention developed a 200 kW microturbine engine with annular recuperator. The goals of the AMTS Project were to achieve: (1) 40/45 percent fuel-to-electricity efficiencies; (2) capital cost of less than $500 per kW of rated output power; (3) reduction in NOx emissions to less than 9 parts per millions; (4) mean period of machine operation between overhaul of several years; and (5) greater flexibility in types of usable fuels.

There is a continuing need for improvements in recuperator technology for microturbines, and particularly for recuperators suitable for use with larger microturbines such as the 200 kW microturbine developed by the assignee of the present invention. In particular, improving the efficiency of the radial distribution of compressed air within the recuperator core segments will allow use of recuperator core segments having a greater radial width to axial length ratio while maintaining a high level of heat exchanger effectiveness.

SUMMARY OF THE INVENTION

The much larger physical size and much greater heat transfer demands required for a recuperator suitable for use with a 200 kW microturbine led the assignee of the present invention to develop a completely new design for an annular counter-flow primary surface recuperator.

The physical dimensions of the microturbine, combined with the surface area required to provide the necessary heat transfer, led to the construction of an annular recuperator having a relatively high ratio of radial width to axial length, which in turn led to the design of an internal recuperator core segment geometry which substantially improves compressed air flow to the radially outer portions of each recuperator core segment.

Additionally, new manufacturing techniques provide a recuperator core segment construction having a minimum number of parts and providing for efficient and economical assembly thereof In one embodiment of the present invention a method is provided for assembly of a recuperator core. A supply of first heat exchanger foils and a supply of second heat exchanger foils are provided, the first heat exchanger foils having a first fin fold orientation and the second heat exchanger foils having a different second fin fold orientation. An indexing indicator is formed on each of the first heat exchanger foils and each of the second heat exchanger foils, such that an improper assembly of two first heat exchanger foils or two second heat exchanger foils is visibly distinguishable from a proper assembly of one first heat exchanger foil and one second heat exchanger foil. The indexing indicator is preferably provided by forming each heat exchanger foil with two corners of different radius. In a proper assembly of one first heat exchanger foil and one second heat exchanger foil, the respective corners are aligned. When an improper assembly is made of two first heat exchanger foils or two second heat exchanger foils, a misalignment of corners results thereby visibly indicating an improper assembly.

In another aspect of the invention a heat exchanger foil includes a foil sheet having an overall generally trapezoidal outer profile defined by a longer side, a shorter side parallel to the longer side, and first and second sloped manifold sides of substantially equal length. First and second indexing corners are each defined in the generally trapezoidal outer profile at an intersection of the shorter side and a sloped manifold side, each first and second indexing corner having a generally curved outer profile defined by a first indexing radius and a second indexing radius, respectively. The first indexing radius and the second indexing radius are selected such that, for two such identical foils, mating a first indexing corner of one foil with a second indexing corner of the second foil creates a distortion in the profile of the mated assembly identifiable by the human eye or by automated inspection means.

In another aspect of the invention a recuperator for a gas turbine engine includes a plurality of cells, or recuperator core segments, disposed in juxtaposed relation to one another in an annular array. Each of the cells includes a first plate having spaced integral ribs thereon at least partially defined in a plurality of spaced high pressure air channels, and a second plate welded to the first plate and having a plurality of spaced integral ribs, which in combination with the first plate of an adjacent cell, define a plurality of low pressure exhaust gas channels. First and second extended spacer bars are mounted on the radially inner edges of the first and second plates, respectively, and extend beyond the cell. The first spacer bar has a height less than the ribs on the first plate. The second spacer bar has a height greater than the ribs on the second plate. Due to the lesser height of the first extended spacer bar and the greater height of the second extended spacer bar, the first and second extended spacer bars provide an offset indexing lip along the radially inner edge of the cell. This offset indexing lip provides a visual and tactile indication of the proper orientation of the recuperator core segments relative to each other so as to insure proper assembly thereof.

In still another aspect of the invention a method of assembly of the recuperator core includes providing a supply of recuperator core segments, each made from a first heat exchanger foil having a first fin fold orientation and a second heat exchanger foil having a different second fin fold orientation. Each recuperator core segment is also provided with an offset indexing lip on a radially inner edge thereof, the offset indexing lip being consistently oriented relative to the first and second heat exchanger foils of each of the recuperator core segments. A plurality of the recuperator core segments are assembled together with their offset indexing lips nested together so that the first heat exchanger foil of each recuperator core segment is adjacent the second heat exchanger foil of the adjacent recuperator core segment, so as to prevent nesting of the fin folds of adjacent recuperator core segments.

Accordingly, it is an object of the present invention to provide an improved recuperator core segment construction.

Another object of the present invention is the provision of improved methods of construction of recuperator core segments and of annular recuperators.

And another object of the present invention is the provision of a recuperator core segment and a method of assembly thereof which insures proper assembly of the recuperator core segment from one first heat exchanger foil and one second heat exchanger foil, wherein the first and second heat exchanger foils have different fin fold patterns to prevent nesting of the fin folds of adjacent heat exchanger foils.

And another object of the present invention is the provision of a recuperator core segment construction and assembly method wherein each recuperator core segment is provided with an offset indexing lip along its radially inner edge so as to insure proper orientation of one recuperator core segment relative to another and to prevent nesting of fin folds between adjacent recuperator core segments.

Other and further objects features and advantages of the present invention will be readily apparent to those skilled in the art upon reading of the following disclosure when taken in conjunction with the accompanying drawings.

DESCRIPTION OF THE PREFERRED EMBODIMENTS

Figure 1:
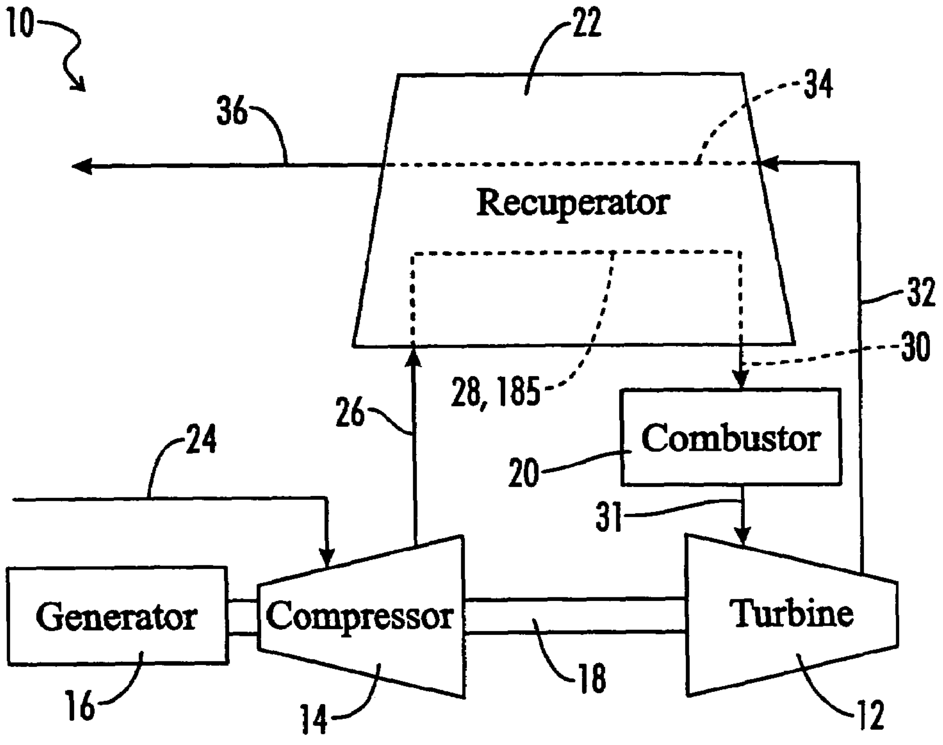
FIG. 1 (PRIOR ART)
FIG. 1 shows a schematic diagram of a microturbine having an annular counter flow recuperator.

Referring now to the drawings, and in particular to FIG. 1, a microturbine is shown and generally designated by the numeral 10. The microturbine 10 and its major components are schematically illustrated in FIG. 1. The microturbine includes a turbine 12, a compressor 14 and a generator 16 all of which are located upon a common shaft 18. The microturbine further includes a combustor 20 and a recuperator 22 which is the particular object of the present invention.

Fresh combustion air enters the microturbine 10 as indicated at the microturbine inlet air passage 24. The combustion air typically passes through the generator 16 to provide some cooling to the components of the generator 16. The inlet air is then compressed by compressor 14 and high pressure air exits compressor 14 via the recuperator compressed air passage 26 which directs the compressed air through the recuperator 22 along C-shaped path 28. The compressed air is preheated in the recuperator 22, and the preheated compressed air exits the recuperator via preheated compressed air passage 30 which carries it to combustor 20. The preheated compressed air is combined with fuel in combustor 20 in a known manner and the heated products of combustion are directed via turbine inlet passage 31 to the turbine 12 to power the turbine 12 which in turns drives the compressor 14 and generator 16 via the common shaft 18. Hot exhaust gas from the turbine 12 is carried via turbine exhaust passage 32 back to the recuperator 22. The exhaust gas flows in an axial path through the gas side the recuperator along the recuperator exhaust gas passage 34. The spent low pressure exhaust gas is exhausted via the microturbine exhaust passage 36 after it passes through recuperator 22.

The recuperator 22 can be generally described as an annular counter flow recuperator or heat exchanger. The annular recuperator surrounds the compressor 14 and turbine 12 and is made up of a large number of individual recuperator core segments as further described below.

Figure 2:
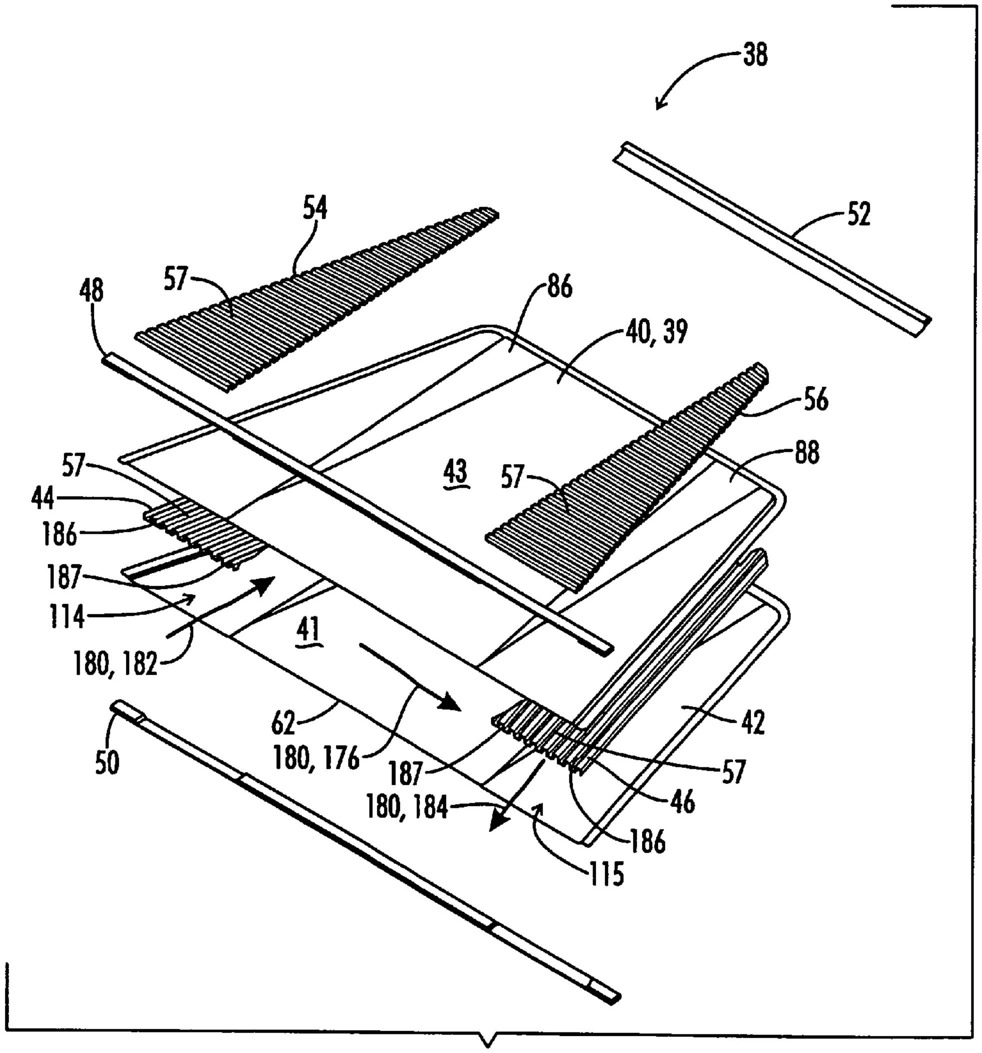
FIG. 2 is an exploded view of a recuperator core segment of one embodiment of the present invention.

FIG. 2 shows an exploded view of one of the individual recuperator core segments of one embodiment of the recuperator 22. The individual recuperator core segment is generally designated by the numeral 38. The recuperator core segment 38 may also be referred to as a recuperator cell 38.

The components of the recuperator core segment 38 are shown in exploded view in FIG. 2 and include first and second heat exchanger foils 40 and 42, respectively. Heat exchanger foils 40 and 42 may also be referred to as heat exchanger sheets or plates.

Figure 7:
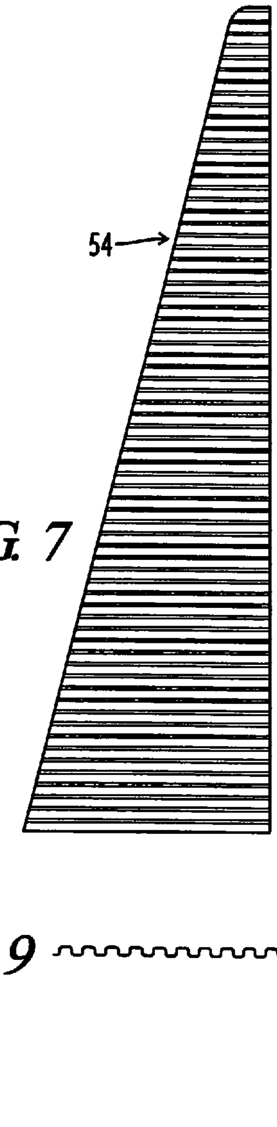
FIG. 7 is a plan view of the gas channel inserts.
Figure 8:
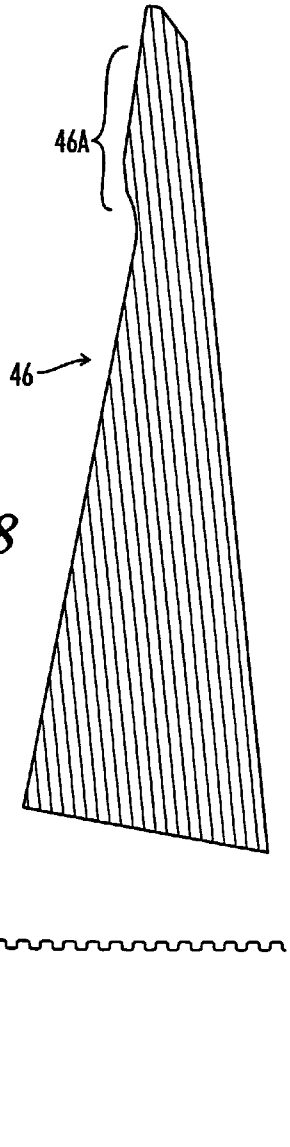
FIG. 8 is a plan view of the air channel inserts.
Figure 9:
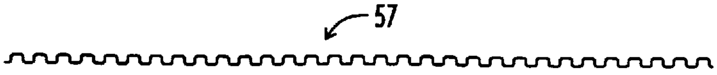
FIG. 9 is an end view of the gas channel insert of FIG. 7.

Referring now to FIGS. 2 and 8, the recuperator core segment 38 of this embodiment further includes an air manifold inlet insert 44 and an air manifold outlet insert 46 which are inserted between the heat exchanger foils 40 and 42 in a manner further described below. Other embodiments, not shown, do not require air manifold inserts. Referring now to FIGS. 2 and 7, the recuperator core segment 38 of this embodiment further includes gas channel inserts 54 and 56 which are attached to one side of the recuperator core segment and provide spacing between adjacent recuperator core segments to aid in the flow of hot exhaust gases, as further described below. Other embodiments, not shown, do not require exhaust manifold inserts. Recuperator core segment 38 further includes first and second stiffener support spacers 48 and 50 which are sandwiched about the heat exchanger foils 40 and 42 along their axially extending radially inner edge in a manner further described below. The air inserts 44 and 46 and the gas channel inserts 54 and 56 are preferably constructed from corrugated stainless steel sheet material 57 having a cross-section generally as shown in FIG. 9. Recuperator core segment 38 further includes a weld cap 52 which will be received along the axially extending radially outer edge of the recuperator core segment.

Figure 6:
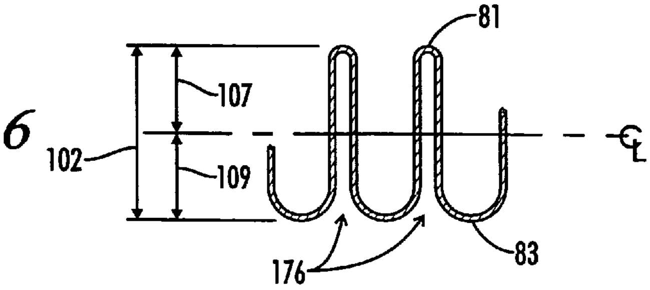
FIG. 6 is a cross-sectional view of fin fold material of the heat exchanger foils of FIG. 3.

Each of the heat exchanger foils 40 and 42 is preferably constructed from a sheet of fin folded material. The material typically is stainless steel or nickel alloy sheet having a thickness of approximately 0.0040 inches. One suitable geometry for the fin fold corrugations of the fin fold sheet is shown in FIG. 6. Such fin fold material is readily available from a number of sources including for example Robinson Fin of Kenton, Ohio.

Figure 3:
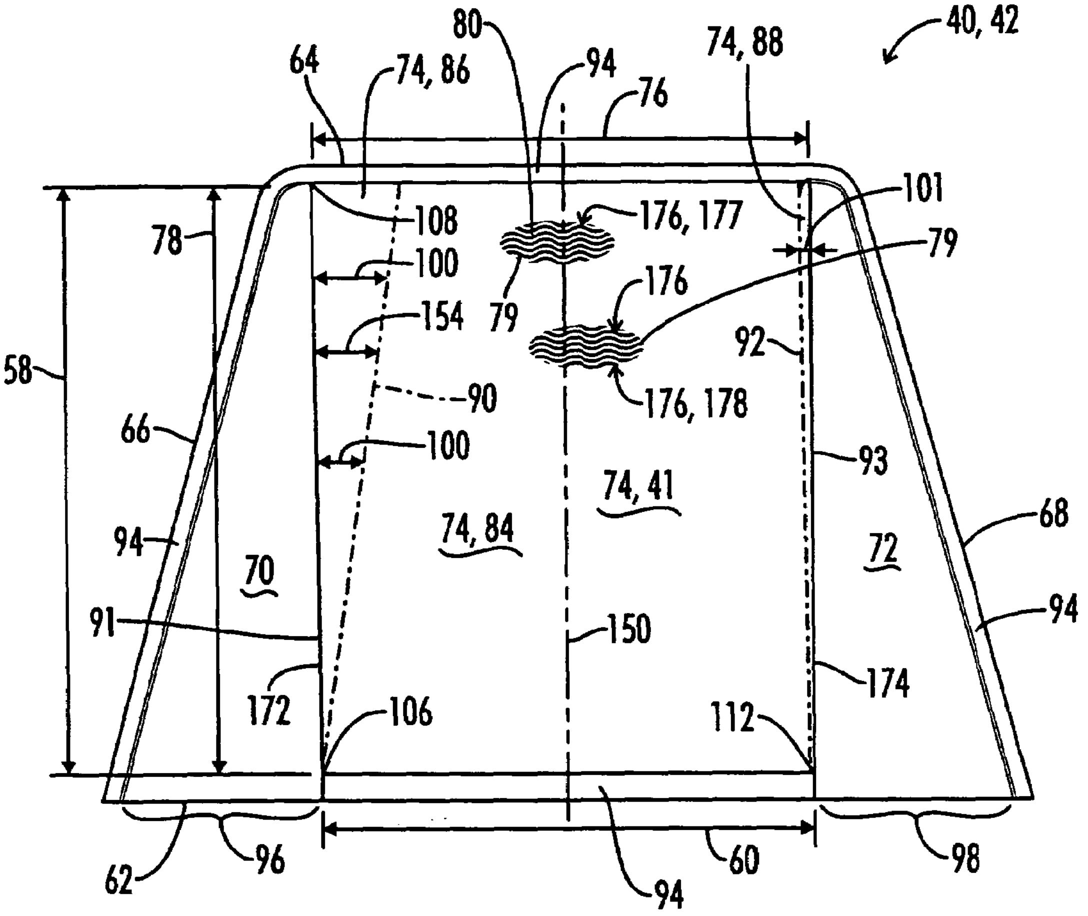
FIG. 3 is profile view of an inner surface or air side of one of one heat exchanger foil or sheet of the recuperator core segment of FIG. 2.
Figure 4:
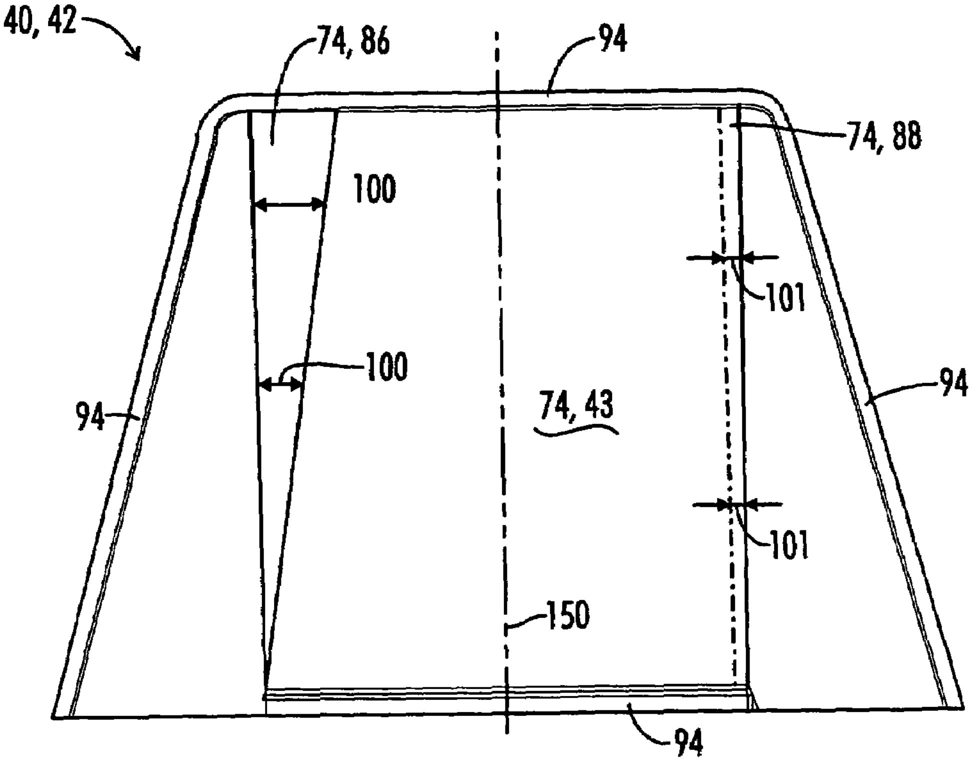
FIG. 4 is an outer surface or gas side view of the heat exchanger foil of FIG. 3.

FIG. 3 is a plan view of the air side of one of the heat exchanger foils 40 and 42, and FIG. 4 is a plan view of the gas side of one of the heat exchanger foils 40 and 42. It will be understood that as used herein the air side of the heat exchanger foils refers to the interior surfaces 41 of heat exchanger foils 40 and 42 of an assembled recuperator core segment 38 through which the compressed air will flow. By gas side the following description refers to those exterior surfaces of the heat exchanger foils 40 and 42 of an assembled recuperator core segment 38, past which the hot exhaust gases will flow.

A preferred embodiment of the heat exchanger foil is shown in FIGS. 3 and 4. The heat exchanger foil shown is a sheet 40 or 42 of fin fold material having first and second manifold zones 70, 72 separated by a primary surface zone 74. The primary surface zone 74 includes a central portion 84 made of generally uniform foil corrugations 79 of a full height, and a first transition zone 86 is located between the central portion 84 and the first manifold zone 70. The first transition zone 86 is made of foil corrugations 79 of heights less than a full height. The foil corrugations 79 of the first transition zone 86 continuously increase in height from the first manifold zone 70 to the central portion 84.

Figure 5:
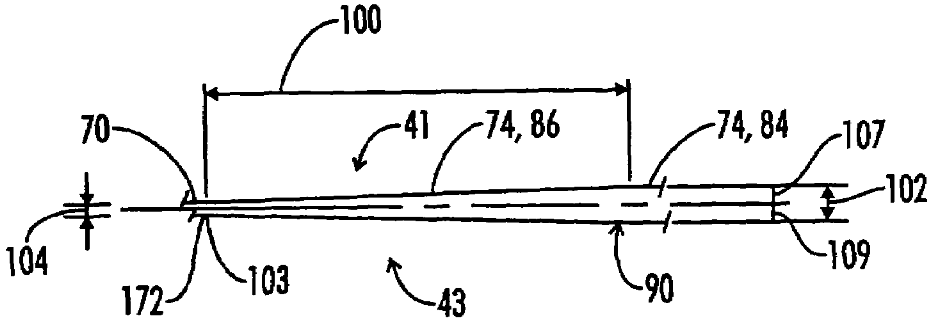
FIG. 5 is a partial cross-section view of the transition zone of the heat exchanger foil of FIG. 3 taken along reference line 154 of FIG. 3.

Referring now to FIG. 5, which is generally a cross section taken through the first transition zone 86 along first transition zone reference line 154 of FIG. 3, the transition zone 86 has an axial extending width 100. In the manifold zone 70, the corrugations 79 have been crushed and have a sheet thickness 104. In the central portion 84 of primary surface zone 74, the corrugations 79 have their full height. Herein, full height refers to crest to centerline distance. As illustrated in FIG. 6, the gas side crests 81 have a full height of 107, and air side crests 83 have a full height of 109. The fin fold material has a crest-to-trough height 102 equal to the combined full heights 107 and 109 of the gas side crests 81 and the air side crests 83.

Referring again to FIGS. 3 and 4, the first transition zone 86 is relatively narrower and the foil corrugations 79 of the first transition zone 86 are more steeply sloped in areas proximal the inlet area 96 of the first manifold zone 70. The transition zone is relatively wider and the foil corrugations 79 of the first transition zone 86 are less steeply sloped in areas distal to the inlet area 96. In this embodiment, the primary surface zone 74 is rectangular in shape, and the first transition zone 86 of the primary surface zone 74 is triangular in shape. In other embodiments of the invention, the first transition zone 86 may have continuous variations in width. In yet other embodiments, the first transition zone 86 may have discontinuous variations in width In this embodiment of the invention, each corrugation 79 of the first transition zone 86 has a generally constant aspect ratio, that is rise/run. Other embodiments of the invention have corrugations 79 with aspect ratios that vary along the length of the corrugation 79 within the first transition zone 86. In the embodiment shown in FIG. 3, the aspect ratios of the foil corrugations 79 of the first transition zone 86 vary from corrugation 79 to adjacent corrugation 79 and continuously decrease in a direction away from the inlet area 96. The aspect ratios of the foil corrugations 79 of the first transition zone 86 vary between 1:60 (closest to outer edge 64) and 1:0.5 (closest to inner edge 62).

In the embodiment shown in FIG. 3, a second transition zone 88 is located between the central portion 84 and the second manifold zone 72. The second transition zone 88 has foil corrugations 79 of heights less than full height. In this embodiment, the foil corrugations 79 of the second transition zone 88 have aspect ratios generally equal to a constant aspect ratio, that is they all have substantially the same slope. The constant aspect ratio is selected to be an aspect ratio of between 1:2 and 1:0.5. This produces a narrow second transition zone 88 between the central portion 84 and the second manifold zone 72. As further described below, this feature provides greater strength in the hot end of the recuperator core segment and reduces the likelihood of distortion of the heat exchanger foils 40 and 42 under operating conditions and, therefore, is one factor in eliminating the need for an air manifold insert 46 between the heat exchanger foils in this region of the heat exchanger foils.

In the embodiment shown in FIG. 3, the heat exchanger foils 40 and 42 have an overall generally trapezoidal outer profile defined by a longer axially extending radially inner edge 62, a shorter axially extending radially outer edge 64 parallel to the longer edge, and first and second sloped manifold sides 66, 68 of substantially equal length. The first and second manifold zones 70, 72 are located adjacent the first and second sloped manifold sides 66, 68, respectively. The generally rectangular primary surface zone 74 is located centrally between the first and second manifold zones 70, 72. Raised corrugations 79 extend entirely across the generally rectangular primary surface zone 74 and protrude above and below the manifold zones 70 and 72. The primary surface zone 74 includes the transition zone 86 located adjacent the first manifold zone 70 and having a plurality of raised undulating corrugations 79 extending generally parallel to the longer and shorter sides 62, 64 and increasing in height in a direction away from the first manifold zone 70. The corrugations 79 are shown as crests 80 in the patch work portions of FIG. 3, and preferably are undulating corrugations when seen in planar view. The second transition zone 88 is located adjacent the second manifold zone 72, the second transition zone 88 having a plurality of raised corrugations 79 extending generally parallel to the longer and shorter sides 62, 64 and increasing in height in a direction away from the second manifold zone 72. The central portion 84 is located between the two transition zones, the central portion 84 having a plurality of raised corrugations 79 extending generally parallel to the longer and shorter sides 62, 64 and generally uniform in height. In the embodiment shown in FIGS. 3 and 4, each opposite planar surface 41, 43 of the heat exchanger foil 40 or 42 includes two manifold zones 70, 72 and one primary surface zone 74, including one central portion 84 and two transition zones 86, 88.

Figure 17:
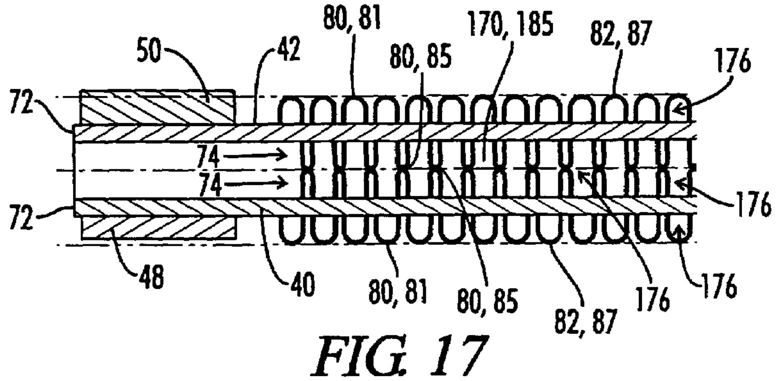
FIG. 17 is a detail view of the radially inner edge region of one recuperator core segment of FIG. 15.

Another aspect of this invention is here described with reference to FIGS. 2, 3, 10 and 17. The recuperator core segment 38 includes first and second heat exchanger foils 40, 42 each having a primary surface zone 74. The primary surface zones 74 are disposed in opposition so as to define an interior axial air passage 170 (see FIG. 17) having an axial air passage inlet 172 (see FIG. 3) and an axial air passage outlet 174. The axial air passage inlet 172 and axial air passage outlet 174 each extend generally transversely away from the inner edge 62 defined by the heat exchanger foils 40, 42. At least one of the primary surface zones 74 includes a plurality of generally evenly spaced corrugations 79 extending from the axial air passage inlet 172 to the axial air passage outlet 174. The corrugations 79 define a corresponding plurality of air channels 176 of even width, as shown in FIGS. 3, 6 and 17. FIG. 17 shows a cross-sectional view of the recuperator core segment 38 of FIG. 10 along the manifold reference line 152. Outlet manifold zones 72 partially obscure the corrugations 79 in the central portion 84 of the primary surface area 74. (For clarity, the outlet transition zone corrugations have been omitted.) The axial air passage 170 includes at least one such plurality of air channels 176.

It will be understood that FIG. 17 is somewhat schematic, in that the corrugations of adjacent heat exchanger foils 40 and 42 do not neatly align at their points of engagement as illustrated. Instead they crisscross each other due to the different corrugation patterns, so as to prevent nesting of the corrugations or fin folds.

Referring again to FIGS. 2, 3, 5 and 10, selected corrugations 79 each have an aspect ratio (rise/run) defined along a first transition length 100 of the selected corrugation 79 along which the height of the selected corrugation 79 rises from a reduced height 103 at the axial air passage inlet 172 to a full height 107 or 109. In this embodiment, the aspect ratios of the selected corrugations 79 are selected such that resistance to air flow through the total length of an air channel 177 (see FIG. 3) for air channels distal to the radially inner edge 62 is generally less than resistance to air flow through the total length of an air channel 178 for air channels proximal to the radially inner edge 62.

At least one of the two primary surface zones 74 further includes the first transition zone 86 defined by a plurality of the first transition lengths 100 of the selected corrugations 79. In this embodiment of the invention, each first transition length 100 has a generally constant aspect ratio, that is, it has a straight slope rather than a curved slope. Other embodiments of invention, not shown, have aspect ratios that vary over at least one transition length 100. In the embodiment of the invention shown in FIG. 3, the aspect ratios of a plurality of the first transition lengths of the first transition zone 86 continuously decrease in a direction away from the radially inner edge 62. These aspect ratios of the plurality of the first transition lengths 100 of the first transition zone 86 may vary between 1:60 and 1:0.5, and are more preferably between 1:30 and 1:1.

The very narrow second transition zone 88 is best described with reference to FIGS. 3 and 4. In second transition zone 88 each corrugation 79 has an aspect ratio defined by a second transition length 101 of the additional selected corrugation 79 along which the height of the selected corrugation 79 rises from a reduced height at the axial air passage outlet 174 to a full height. In this embodiment a plurality of the second transition lengths 101 of the second transition zone 88 each have a generally constant aspect ratio. Other embodiments of invention, not shown, have aspect ratios that vary over at least one second transition length 101. In yet another embodiment of the invention, the first transition zone 86 and the second transition zone 88 are symmetric with respect to the center reference line 150, as illustrated in FIG. 2. In still yet another embodiment the first transition zone 86 and the second transition zone 88 are both triangular, again as illustrated in FIG. 2.

Figure 10:
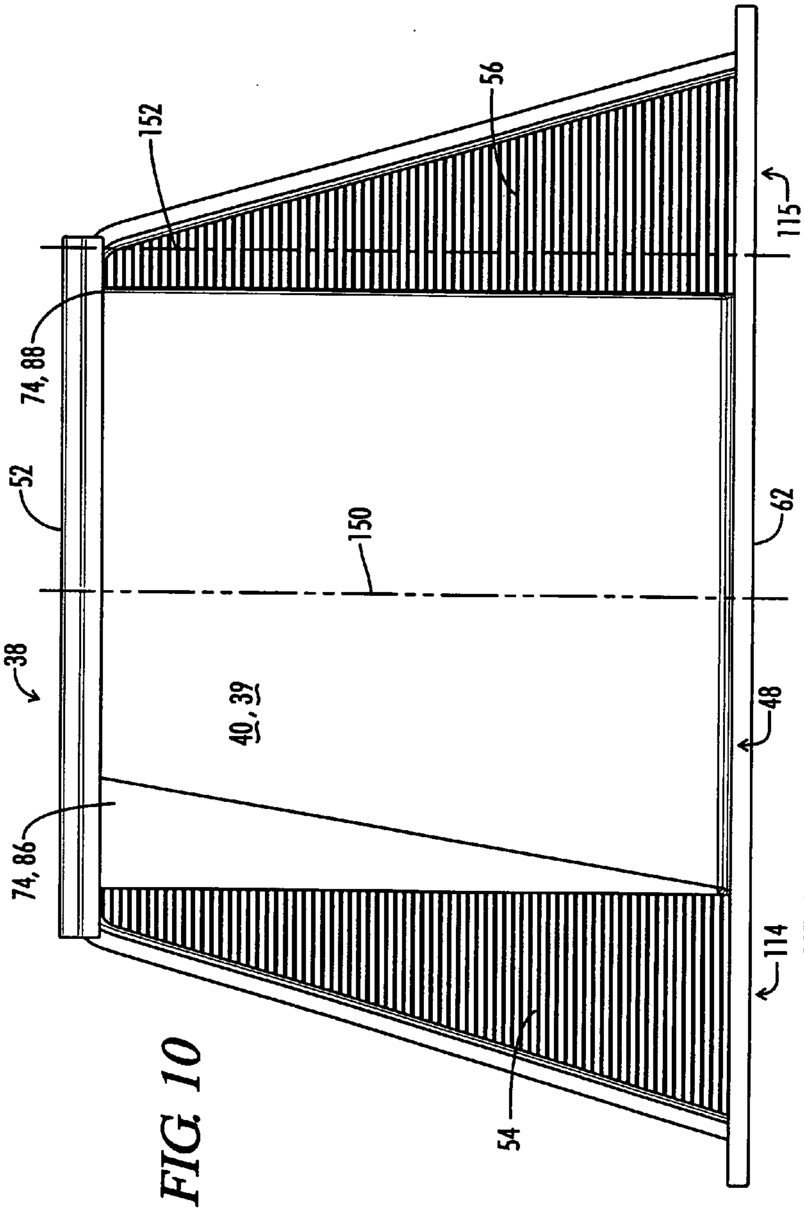
FIG. 10 is a plan view of a recuperator core segment.

In the embodiment of the invention shown in FIGS. 3, 4 and 10, the aspect ratios of a plurality of the second transition lengths 101 of the second transition zone 88 are a generally constant aspect ratio. These aspect ratios of the plurality of the second transition lengths 100 of the second transition zone are an aspect ratio of between 1:2 and 1:0.5, and are more preferably an aspect ratio of 1:1.

The full height crests of a central zone of one heat exchanger foil 40 engage the full height crests of an opposing central zone of one heat exchanger foil 42, while the crests of opposing transition zones do not engage each other unless there is distortion in the heat exchanger foils. Excessive temperatures tend to cause material creep and may cause distortion of recuperator core segments 38 in the air outlet/gas inlet regions. The narrow second transition zone 88 provides for a larger central zone 86 having full height crests 80. This cell geometry provides for additional structural support for the opposing sheets necessary for the 'hot' end of the recuperator core.

Figure 11:
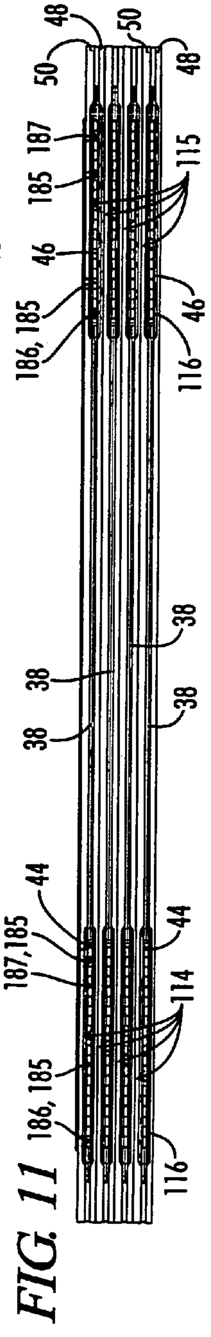
FIG. 11 is a radially inner edge view of a plurality of recuperator core segments of FIG. 10 in a nested configuration.

Referring now to FIG. 11, the recuperator core segment further includes an air inlet 114 and an air outlet 115, each defined in the radially inner edge 62. An interior air passage 180 (see FIGS. 16 and 17) is formed by a plurality of interior air passage channels 176 and provides fluid communication between the inlet 114 and outlet 115. The interior air passage 180 includes an inlet manifold passage 182 (see FIG. 2) extending radially outward from the inlet 114; an outlet manifold passage 184 extending radially inward to the outlet 115; and the axial air passage 170 (see FIG. 17) extending generally axially between the inlet manifold passage 182 and the outlet manifold passage 184. First and second air manifold inserts 44, 46 are received within the inlet manifold passage 182 and the outlet manifold passage 184, respectively. The first and second air manifold inserts 44, 46 have first and second air manifold corrugations 57, as best seen in FIG. 9, extending from the inlet 114 and outlet 115 toward the axial air passage inlet 91 and an axial air passage outlet 93, respectively. Referring to FIGS. 2 and 3, the first and second air manifold corrugations 57 have axially outer corrugations 186 in fluid communication with generally corresponding radially outer primary surface zone air channels 177 and further have axially inner corrugations 187 in fluid communication with generally corresponding radially inner primary surface zone air channels 178. Corresponding primary surface zone air channels 176 and manifold corrugations 57 form interior air passage channels 185 defining channels of flow through the interior air passage.

The aspect ratios of this embodiment are selected such that resistance to air flow through the total length of any interior air passage channel 185 is sufficiently equal to air flow through the total length of any other interior air passage channel 185 that substantially uniform air flow rates are achieved across as much as possible of the area of the primary surface zone. The transition zone 86 has allowed this to be achieved for the primary surface zone 74 having a radial width 58 to axial length 60 ratio in a range of from 0.9 to 1.1.

Greater balance in airflow through the primary surface zones provides greater heat exchanger effectiveness. This allows a greater radial width to axial length of the primary surface zone. This is advantageous in design situations where there is a limit on the axial length of the recuperator.

With reference to FIG. 8, it is noted that the air channel insert 46 has an irregular shaped portion 46A extending toward its associated transition zone 88 adjacent a distal end of the air channel insert. Air channel insert 44 is similarly shaped. This aids in distributing air flow to and from the radially outermost portions of primary surface zone 74.

FIGS. 2, 3, 12, 13, and 14, illustrate another aspect of the present invention. As noted, the first and second heat exchanger foils 40 and 42 each having an integrally formed peripheral mating flange 94. The peripheral mating flange 94 of the first and second heat exchanger foils 40 and 42 are mated with each other and joined together to provide a recuperator core segment 38 free of any separate internal spacer bars. Each integrally formed peripheral mating flange 94 extends all around the periphery of the sheet except for the inlet 114 and outlet 115. At least one of the integrally formed peripheral mating flanges 94 is an offset flange. The peripheral mating flanges 94 of the first and second heat exchanger foils 40 and 42 are joined together by a peripheral weld and the weld cap 52 is received over at least a portion of the peripheral weld. In this embodiment of the invention, each of the first and second heat exchanger foils 40 and 42 is comprised of fin fold sheet material and the mating flanges 94 are crushed areas of the fin folded sheet material.

It is a distinct advantage to eliminate the need for internal spacer bars through the use of offset peripheral flanges. The offset peripheral flanges are of the same thickness as the rest of the sheet material and have generally the same thermal transient characteristics. By eliminating the relatively thick internal spacer bars of the prior art, a recuperator core segment's transient thermal stress due to thermal lag is greatly reduced.

As best seen in FIGS. 2 and 11, first and second stiffener support spacer bars 48, 50, which may also be referred to as stiffener support spacers, engage a portion of the peripheral mating flanges 94 of the first and second sheets 40, 42, respectively. The stiffener support spacer bars 48, 50 each having recesses 116 defined therein, the recesses 116 coinciding with the inlet 114 and the outlet 115, and the peripheral mating flanges 94 are sandwiched between the stiffener support spacer bars 48, 50.

Indexing Corners

In order to prevent nesting of the corrugations 79 of adjacent heat exchanger foils 40 and 42 forming a recuperator core segment 38, the heat exchanger foils 40 and 42 are formed with different patterns of undulations.

Also note that each heat exchanger foil has an offset mating flange 94 formed around most of the periphery thereof. The two heat exchanger foils 40 and 42 will be mated together, flange to flange, like a clamshell.

During the construction process it is very important to avoid mistakenly assembling together two heat exchanger foils 40 or two heat exchanger foils 42, rather than one heat exchanger foil 40 with one heat exchanger foil 42. To prevent this the heat exchanger foils each have been provided with first and second indexing corners 162 and 164, each having a different radius.

The indexing corners of second heat exchanger foil 42 are formed as mirror images (about the plane of flanges 94) of the indexing corners of first heat exchanger foil 40.

Figure 19:
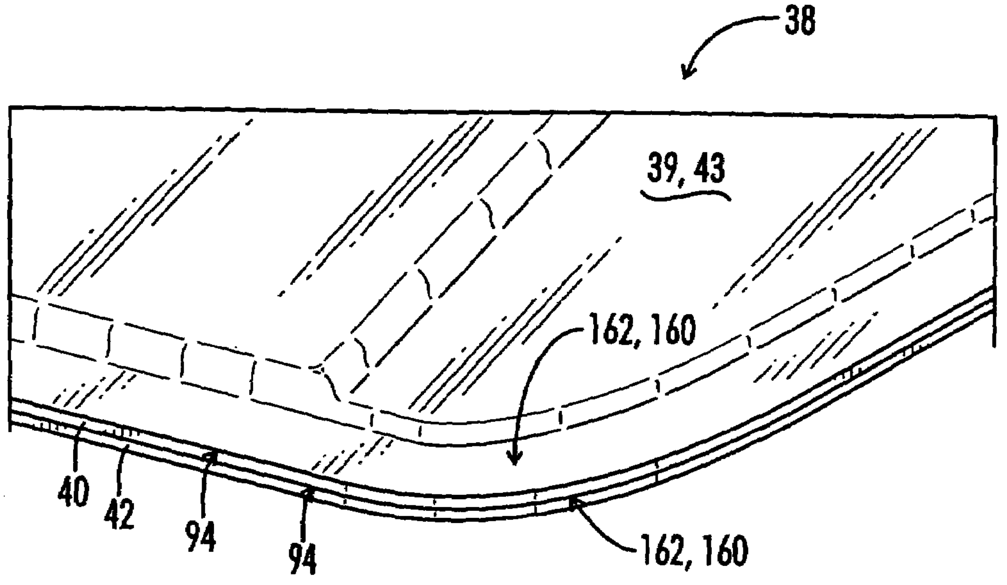
FIG. 19 is a partial oblique view of indexing corners of a properly assembled recuperator core segment having no profile distortion.
Figure 20:
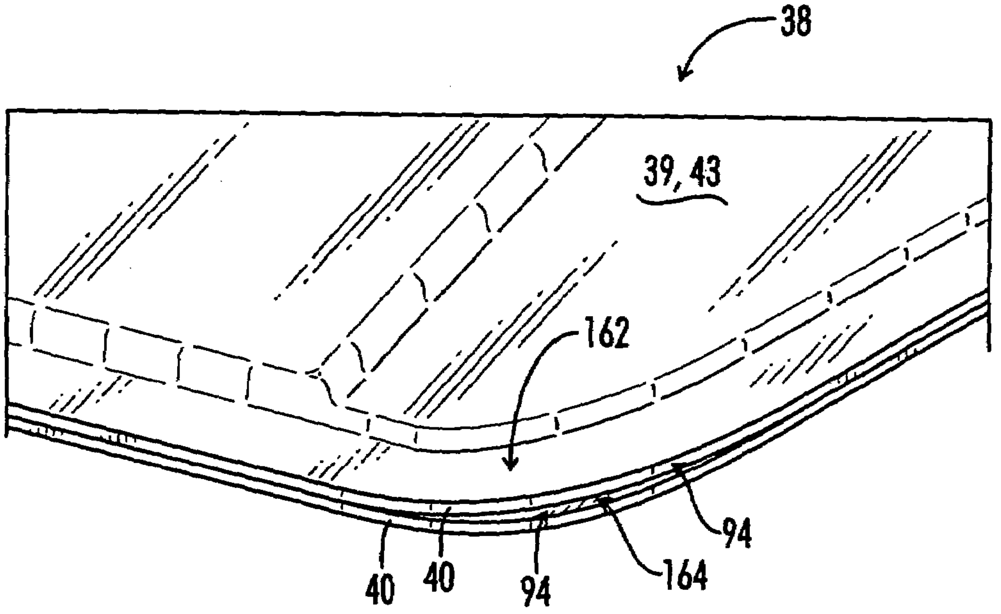
FIG. 20 is a partial oblique view of indexing corners of an improperly assembled recuperator core segment having a profile distortion.

As shown in FIG. 19, each corresponding indexing radius is selected such that alignment of any indexing corner 160, 162 of the first heat exchanger foil 40 with the corresponding indexing corner 160, 162 of the second heat exchanger foil 42 produces an uninterrupted profile of the mated flanges 94. Conversely, as shown in FIG. 20, if one attempts improperly to assemble two identical heat exchanger foils 40 or two identical heat exchanger foils 42, rather than one of each, the improper assembly produces a disruption in the profile of the mated flanges 94 that is detectable. The disruption in the profile of the mated flanges is detectable by visual inspection or by tactile inspection. The disruption in the profile may also be detected by mechanical inspection means as well by use of a micrometer or similar inspection means known to those skilled in the art of assembly and inspection of mechanical systems.

This can be described as forming an indexing indicator on each of the first heat exchanger foils and each of the second heat exchanger foils, such that an improper assembly of two first heat exchanger foils or two second heat exchanger foils is visibly distinguishable from a proper assembly of one first heat exchanger foil and one second heat exchanger foil.

The Offset Indexing Lip

As just described with regard to the indexing corners, it is very important during the assembly of the recuperator core segments 38 that each recuperator core segment be properly assembled from one first heat exchanger foil 40 and from one second heat exchanger foil 42. As previously noted, the first heat exchanger foils 40 and second heat exchanger foils 42 have different fin fold patterns therein so that when they are placed adjacent each other the fin folds thereof will not nest together.

It is equally important when assembling a recuperator core from a plurality of such recuperator core segments that each recuperator core segment be properly oriented so that the first heat exchanger foil 40 of one recuperator core segment is adjacent the second heat exchanger foil 42 of the adjacent recuperator core segment. This again prevents nesting of fin folds between adjacent recuperator core segments.

This proper orientation of the recuperator core segments relative to each other is accomplished in the present invention in part via the use of an offset indexing lip constructed along the inner edge 62 of each recuperator core segment. The following describes the manner of construction of this offset indexing lip and its function in insuring that the recuperator core is properly assembled.

Figure 12:
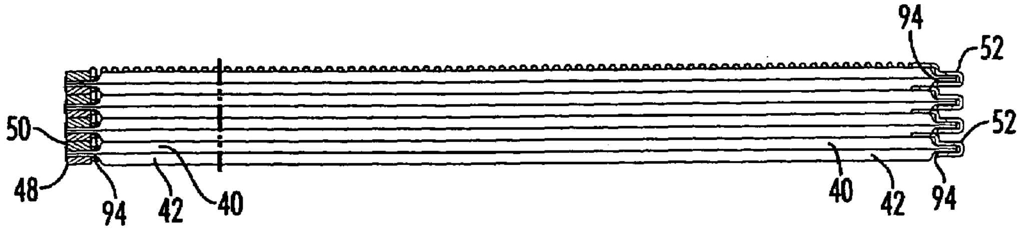
FIG. 12 is a cross-sectional view of the recuperator core segments of FIG. 11 along a centerline reference line like 150 of FIG. 10.
Figure 13:
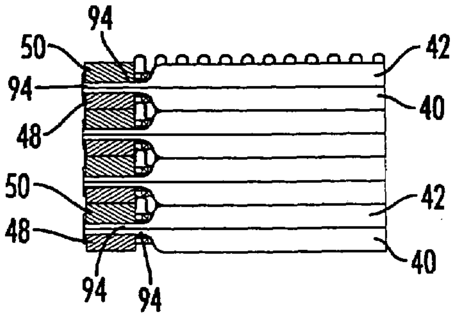
FIG. 13 is a detail, somewhat schematic, view of the radially inner edge region of the recuperator core segments of FIG. 12.
Figure 14:
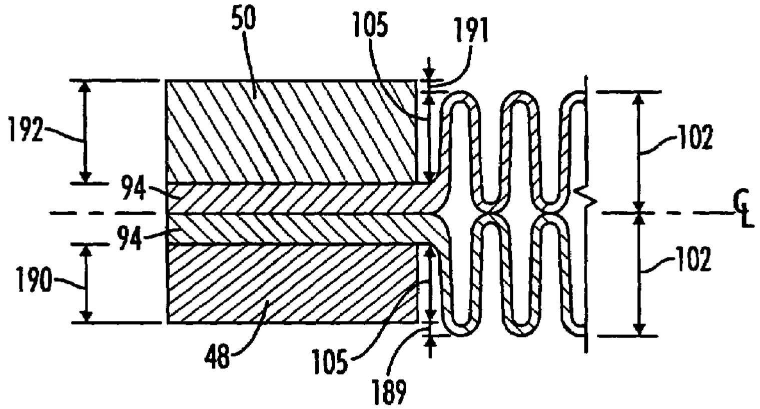
FIG. 14 is a detail view of the radially inner edge region of one recuperator core segment of FIG. 12.
Figure 15:
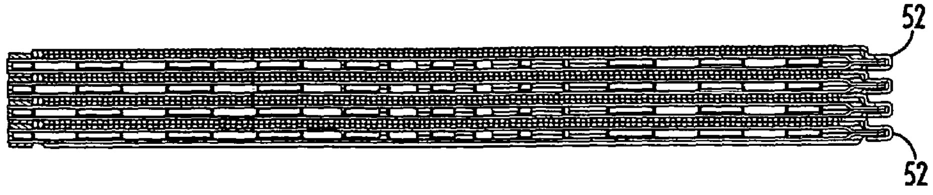
FIG. 15 is a cross-sectional view of the recuperator core segments of FIG. 11 along manifold reference line 152 of FIG. 10.
Figure 16:
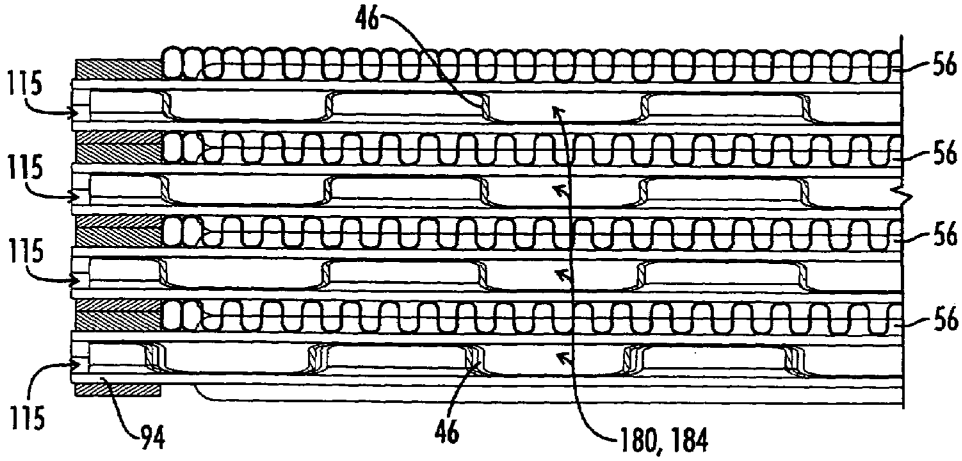
FIG. 16 is a detail view of the radially inner edge region of the recuperator core segments of FIG. 15.

FIGS. 12, 13 and 14 are cross-sectional views of the recuperator of FIG. 10 taken along center line reference line 150. FIGS. 15–17 are cross-sectional views of the recuperator of FIG. 10 taken along the manifold reference line 152.

As best shown in FIG. 14, the fin folds or corrugations of each primary surface zone have a profile height 105 above their respective peripheral flanges 94. It is apparent in viewing FIG. 14, that the first stiffener spacer support bar 48 extends to a height 190, which can be called a first indexing height 190, shorter than the profile height 105 of the fin folds or ribs extending downward from the heat exchanger foil 40. The second stiffener support spacer bar 50, which is attached to the upper side of the second heat exchanger foil 42, in contrast, is a thicker bar which has a height 192, which can be referred to as a second indexing height 192, extending above the profile height 105 of the fins on the second heat exchanger foil.

Thus the combination of the thin bar 48 and the thick bar 50 collectively create an offset indexing lip which in FIG. 14 protrudes upward a distance 191 above the profile of the ribs on the second heat exchanger foil 42 and which create a gap or space on the lower side below bar 48 which is shorter, by a distance 189, than the ribs protruding downward from the first heat exchanger foil 40. By way of example, the crest to trough height 102 may be in the range of 0.100 to 0.150 inches, and the distances 189 and 191 may be in the range of about 0.010 to 0.015 inches. The offset indexing lip provides a tongue and groove arrangement along the radially inner edge with the thicker bar 50 defining the tongue and the thinner bar 48 defining a groove or notch within which the tongue of the adjacent recuperator core segment is received. As further described below with regard to FIGS. 23 and 24, this offset indexing lip will cause the recuperator core segments to nest together at their inner edge 62 when the recuperator core segments are properly manufactured and properly assembled.

Of course, it is necessary to insure that the thin bar 48 and thick bar 50 are properly assembled with the recuperator core segment. This is accomplished as follows, and it will be apparent that there are several safety features built in to redundantly insure proper assembly.

A first fixture (not shown) is constructed for receiving one of the partially constructed recuperator core segments 38 therein, which has not yet had its spacer bars assembled therewith.

Figure 18:
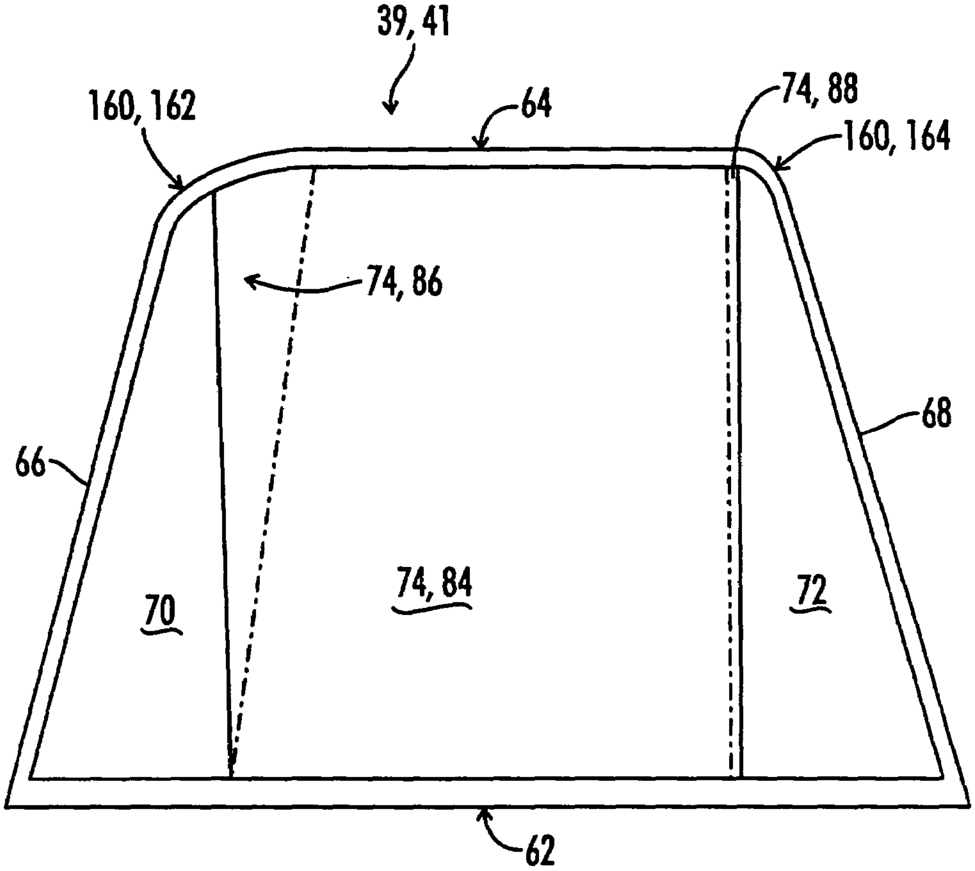
FIG. 18 is a profile view of an inner surface of one heat exchanger foil having indexing corners.

It will be recalled that as shown in FIG. 18, the transition area 86 adjacent the air inlet end of the recuperator core segment is a rather large triangular shape and is visually distinguishable from the very narrow transition area 88 adjacent the outlet end of the recuperator core segment. Also, corners 162 and 164 of different radii are associated with each end of the recuperator core segment.

The human operator will visually orient the recuperator core segment based upon the location of the triangular transition area 86 and place the recuperator core segment in the fixture. The fixture is constructed so that if the recuperator core segment is properly placed therein it will be neatly received, but if the recuperator core segment is placed in a reversed configuration the improper location of the corners 162 and 164 will make the recuperator core segment stand out relative to proper receipt in the fixture. Thus the proper orientation of the partially assembled recuperator core segment in the fixture is insured first by the visual orientation of the transition zone 86 by the operator, and second by the proper or improper receipt of the recuperator core segment within the fixture due to the engagement of the corners 162 and 164 with the fixture.

Once the partially assembled recuperator core segment is received properly in the fixture, it is then necessary to properly assemble the thin and thick spacer bars 48 and 50 with the recuperator core segment. As shown for example in FIG. 14, it is desired to assemble the thin spacer bar 48 on the first heat exchanger foil 40 and the thick spacer bar 50 on the second heat exchanger foil 42.

Figure 21:
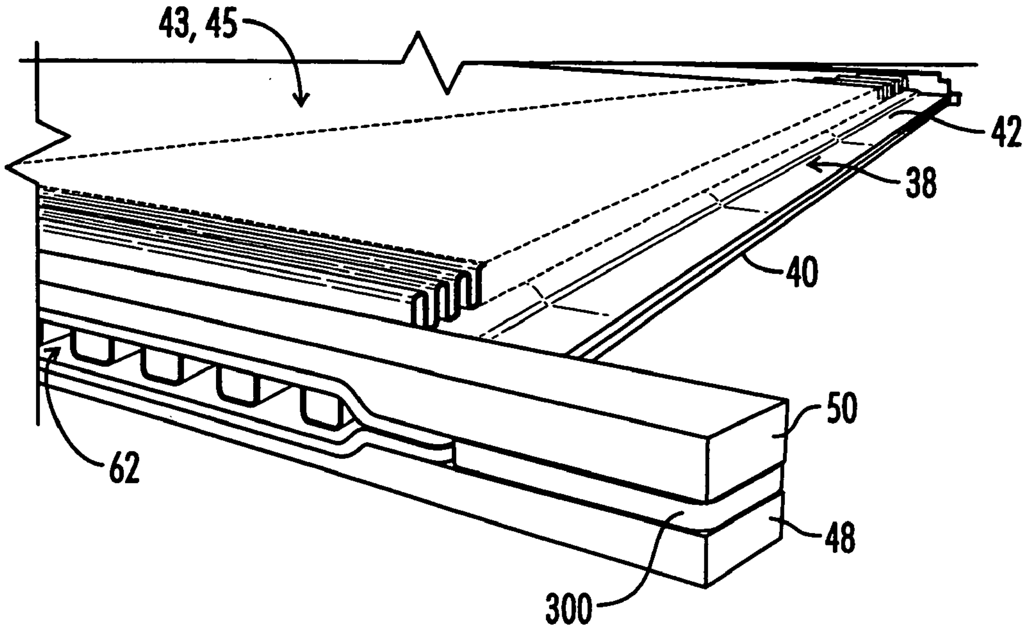
FIG. 21 is an oblique view of a recuperator core segment having first and second indexed stiffener support spacer bars.

As can best be seen in FIG. 21, a thin rectangular block referred to as a gap insert 300 is used to fill the gap between the spacer bars at their actually outermost ends. The gap inserts 300 are actually prewelded in place upon the thin spacer bars 48.

Then the thin spacer bar 48 with its prewelded gap inserts 300 on each end, and the thick spacer bar 50 must be assembled with the recuperator core segment in the fixture previously described. The fixture has channels designed for selective receipt of either the thin spacer bar 48 with its gap inserts or the thick spacer bar 50. The channels are constructed so that it is not possible to insert the wrong spacer bar in the selected channel. Also the fixture is constructed so that it will not properly clamp together if there are two thin spacer bars or two thick spacer bars in place.

Figure 22:
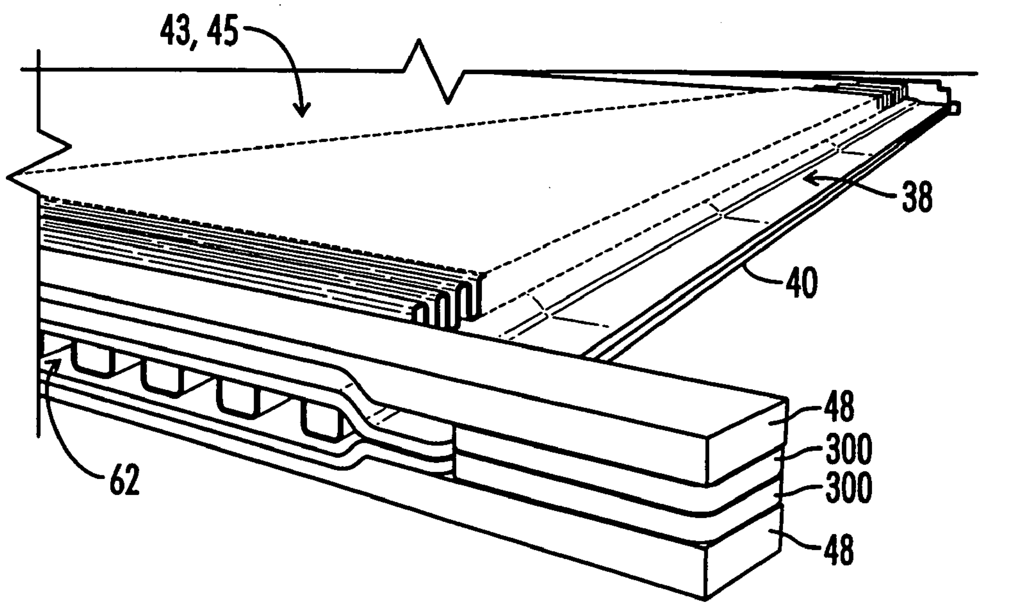
FIG. 22 is an oblique view of a recuperator core segment of FIG. 21 having mismatched indexed stiffener support spacer bars.

Also, as shown in FIG. 22, if an attempt is made to assemble two thin spacer bars 48 each having a gap insert 300 thereon, an excessively thick assembly is created and will be visually detectable.

Next, after the thick and thin spacer bars have been properly assembled with the recuperator core segment, it is necessary to bend the recuperator core segment into its precurved involute form. Once again it is critical that the recuperator core segment be formed in the proper direction relative to the offset indexing lip. This again is accomplished with a process specific fixture. The next fixture (not shown) is constructed having a slot or groove that indexes off of the thick spacer bar 50. To be properly received in the second fixture, the thick spacer bar 50 must be placed within a closely dimensioned groove of the fixture. Then the recuperator core segment is bent to form it into the involute shape.

Figure 23:
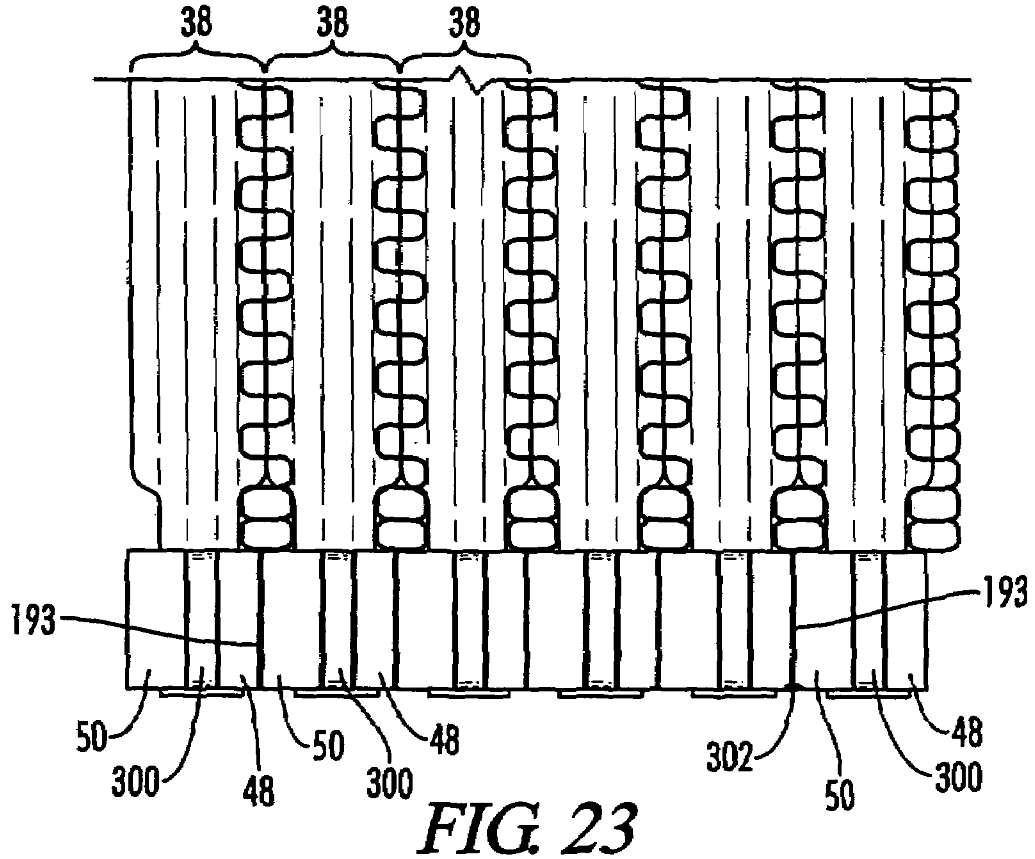
FIG. 23 is a detail cross-sectional view of a plurality of recuperator core segments in a nested configuration, each recuperator core segment having first and second indexed stiffener support spacer bars.
Figure 24:
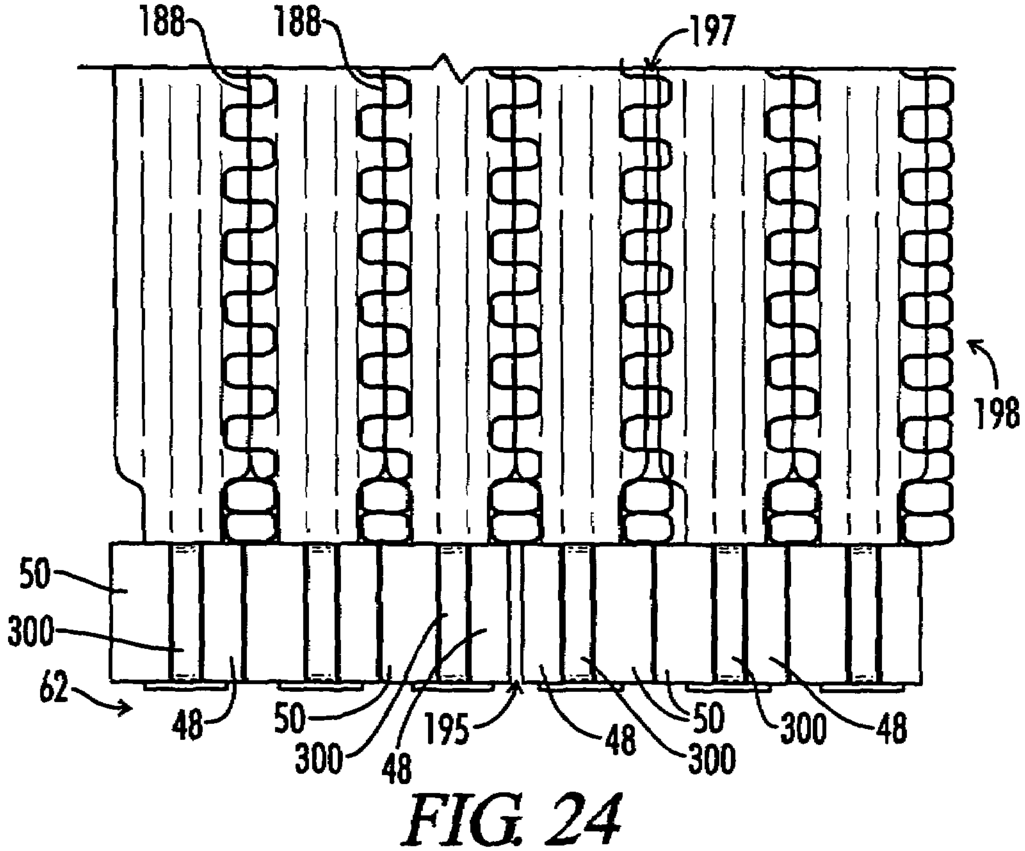
FIG. 24 is a detail cross-sectional view of a plurality of recuperator core segments of FIG. 23 having mismatched indexed stiffener support spacer bars.

The final indicator that a recuperator core has been properly assembled from recuperator core segments that have each been properly manufactured, is illustrated with regard to FIGS. 23 and 24.

FIG. 23 illustrates the radially inner edge of a plurality of recuperator core segments that have been properly assembled together.

In FIG. 23, the line of engagement between a thin spacer bar 48 of one recuperator core segment and the thick spacer bar 50 of the adjacent recuperator core segment is indicated as 193. When the core sector is welded up a relatively shallow surface weld 302 is applied along the radially innermost edge of the line 193. Most of the radially outer portion of the line of engagement 193 remains unwelded and thus provides what may be referred to as a thermal expansion gap 193 between the spacer bars 48 and 50 of adjacent recuperator core segments 38.

When a recuperator core is properly assembled as indicated in FIG. 23, the thick bar 50 of one recuperator core segment will nest against the thin bar 48 of the adjacent recuperator core segment to form the lines of engagement 193.

In the unlikely event that a recuperator core segment 38 gets improperly constructed, then when the improperly constructed recuperator core segment is stacked with other properly constructed recuperator core segments a clearly visible indicating gap 195 will be apparent at the radially inner surface of the assembly. Another gap 197 is also present interior of the assembly. This will be an indication that there is a defective recuperator core segment adjacent the gap 195, and the core sector will need to be disassembled and the defective recuperator core segment replaced.

The gap 195 is visually detectable by the human eye, and may also be detected by suitable mechanical inspection devices.

This process can be summarized as follows. A plurality of recuperator core segments 38 are assembled. Each recuperator core segment includes one of the first heat exchanger foils 40 and one of the second heat exchanger foils 42.

Each of the recuperator core segments 38 is provided with an offset indexing lip 48, 50 along the radially inner edge 62 of the recuperator core segment 38. The offset indexing lip is consistently oriented relative to the first heat exchanger foil 40 and second heat exchanger foil 42 of each recuperator core segment.

When each recuperator core segment 38 is formed into an involute curve, the curve having a concave side is consistently oriented relative to the offset indexing lip, so that when a plurality of said recuperator core segments are stacked together to form a core, the indexing lips of adjacent recuperator core segments nest together and the first heat exchanger foil of each recuperator core segment is adjacent the second heat exchanger foil of the adjacent recuperator core segment, so as to prevent nesting of the heat exchanger foils of adjacent recuperator core segments.

In the unlikely event that a defective recuperator core segment is formed with an improper orientation of its concave side relative to the offset indexing lip, a gap between adjacent offset indexing lips is created such as the gap 195 shown in FIG. 24. This gap is a visible indication of the presence of a defective recuperator core segment.

Recuperator Assembly and Mounting

Figures 25, 26:
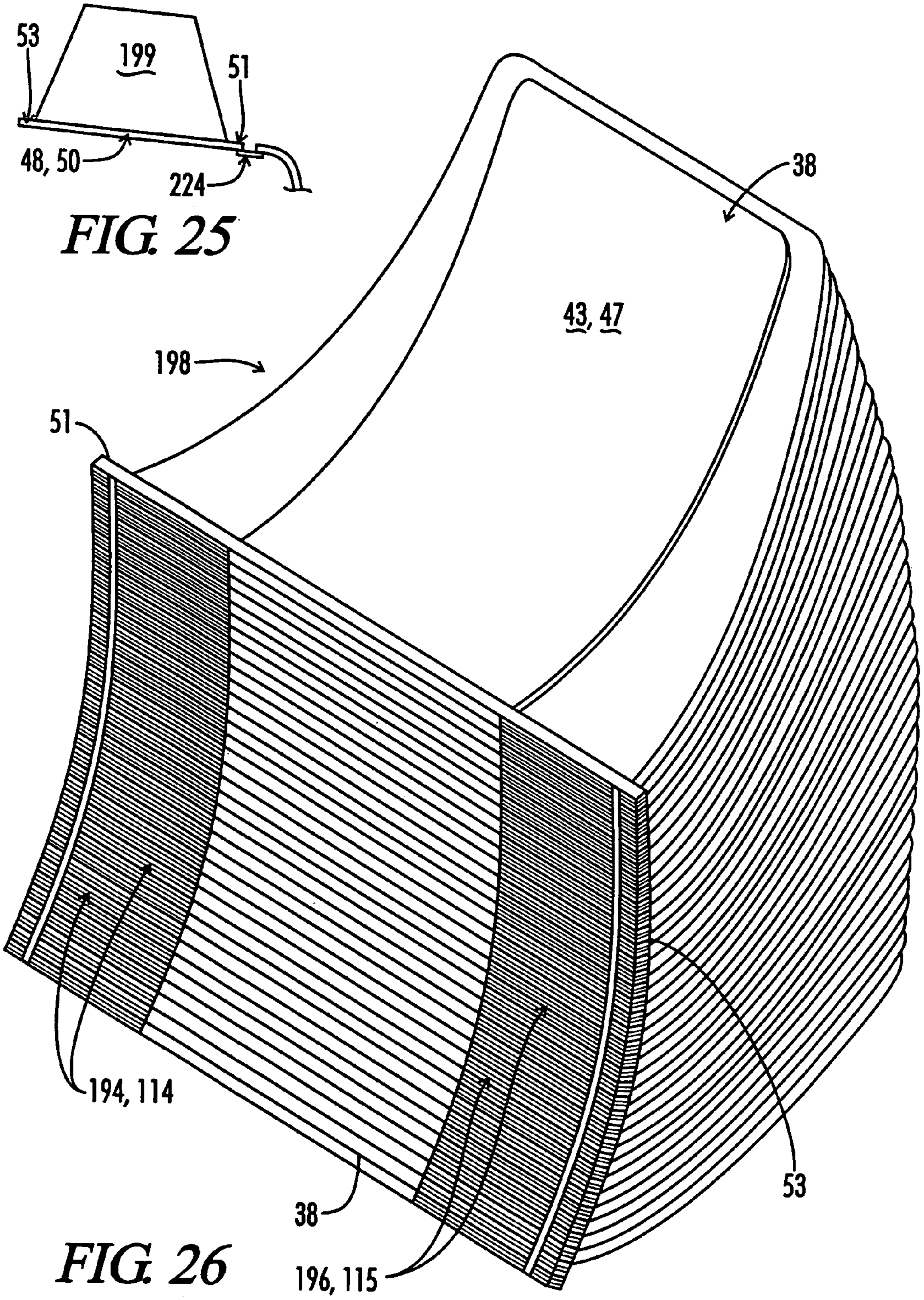
FIG. 25 shows a cross-sectional view of the recuperator showing the attachment of the hot end extensions of the stiffener support spacer bars to a support ring.
FIG. 26 is a recuperator sector.
Figure 27:
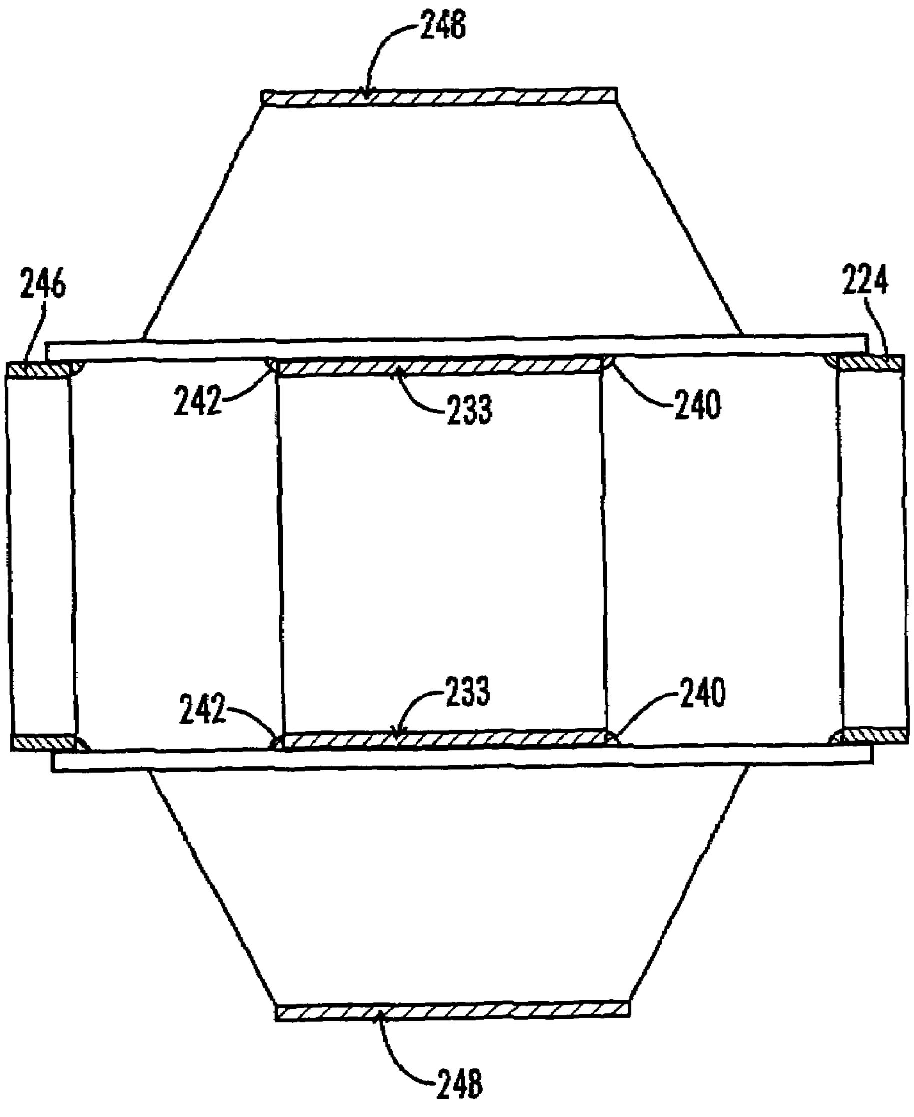
FIG. 27 shows a cross-sectional view of the recuperator core showing the inner case and interface rings welded to the interior surface of the recuperator and showing the outer case surrounding the exterior edges of the recuperator core segments.

Referring now to FIGS. 25–27, the first and second stiffener support spacer bars 48, 50 of the recuperator core segments 38 each have a hot side extension portion 51 extending beyond the peripheral mating flanges 94 of the recuperator core segments in a direction away from the outlets 115 and each have a cold side extension portion 53 extending beyond the peripheral mating flanges 94 in a direction away from the inlets 114. Recuperator core sectors 198 are disposed so as to form an annular recuperator core 199, wherein a plurality of the hot side extension portions 51 are attached to a hot side annular support 224 and wherein a plurality of the cold side extension portions 53 are attached to a cold side annular support 246. In one preferred embodiment, the hot side and cold side annular supports 224, 246 are support rings. In each sector 198 and in the annular core 199, the inlets 114 and outlets 115 of the stacked recuperator core segments 38 are disposed in an annular array of inlets 194 and an annular array of outlets 196 respectively. A cylindrical sleeve or case 233 is disposed within the annular recuperator core 199 between the annular array of inlets 194 and the annular array of outlets 196. The cylindrical sleeve 233 is held in position by welds 240, 242 and provides structural support for the annular core 199.

The present invention's use of a reinforcing sleeve or case 233 as the primary strength member of the inner radial boundary of the annular core 199 is a significant improvement over some prior art designs which utilize fully welded stiffener bars, both intra-cell and inter-cell stiffener bars, to form both the strength bearing core and the inner radial boundaries of the gas and air side passages. The prior art arrangement necessarily produces greater thermal strain and reduced thermal response than does the design of the present invention. The use of offset peripheral flanges, such as 94, in the present invention eliminates the need for interior support bars. Sandwiching the mated flanges with first and second stiffener support bars essentially disconnects individual recuperator core segments and the interior air passage from the transmittal of thermal stresses caused by thermal transients at the core's inner radial edge. The stiffener support bar indexing feature provides for a thermal expansion along the surface where a stiffener support bar is disposed along another stiffener support bar. Use of shallow axial bead welding, as opposed to full welding, of mated stiffener bars reduces the thermal stresses caused by the greater differential expansion of the hot end of the recuperator core compared to the cold end of the recuperator core during operations. In one embodiment, the hot end of the recuperator core has operating dimensions expanded to be 5% greater than the operation dimension of the cold end of the recuperator core along the radial inner edge of the core. Since bead welding only fixes the radially inner portion of the bars together, the thermal gap 193 is allowed to open in the radially outer portion where the stiffener support bars are adjacently disposed.

Methods of Manufacture

Figure 28:
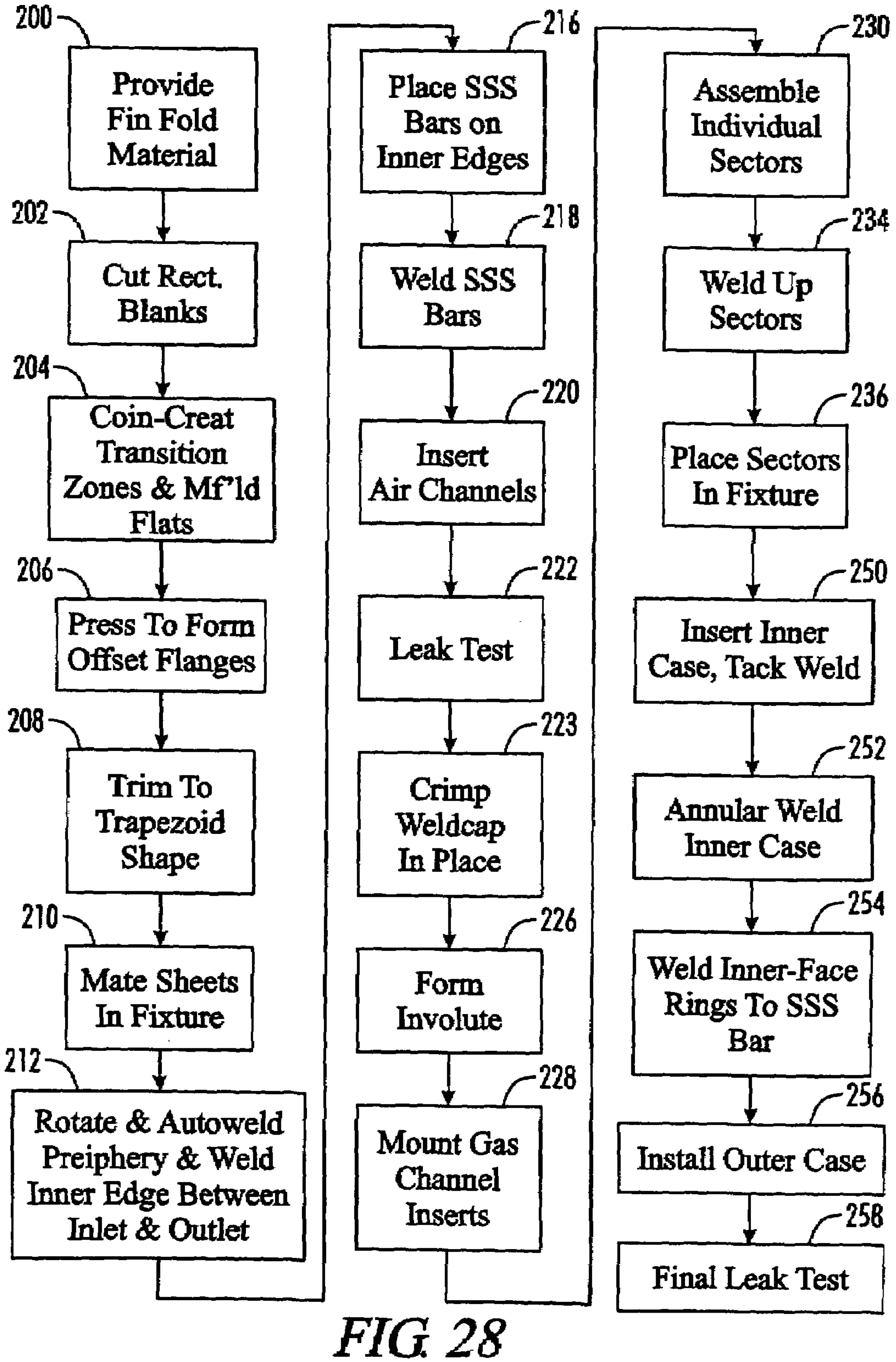
FIG. 28 is a flow chart illustrating the process of manufacturing the annular recuperator of FIG. 23.

The preferred methods of manufacturing the recuperator core segment 38 are best described with regard to the flow chart of FIG. 28.

In one embodiment of the invention, the first step in the process designated as 200 is to provide first and second sheets of fin fold material such as material like that illustrated in detail with regard to FIG. 6. As indicated in step 202 the material is typically cut into rectangular blanks. As further described below, two sets of blanks having different fin fold orientations are cut, and each recuperator core segment will ultimately be formed with one blank from each set.

The sheet of fin folded material of step 200 is substantially completely covered with fins of substantially uniform height. The rectangular blanks of step 202 are orientation blanks. Further, the fin fold material has an undulating array of generally parallel fins on at least one side of the fin fold material and the fins have a generally uniform height, the uniform height being a full height, the fins having at least two selectable fin orientation directions relative to at least one dimension reference. A fin orientation direction is selected and an orientation blank is cut from the fin fold material so as to have at least one dimension reference and so that the fins are oriented in the selected fin orientation direction relative to the dimension reference. In one embodiment the dimension reference of step 202 includes centerlines through the orientation blanks, and the first and second orientation directions are a radially outward direction and a radially inward direction respectively and relative to the centerline.

In step 202 at least one orientation blank provided has a first orientation and at least one orientation blank has a second orientation. In one embodiment, the first orientation is fin fold rest oriented radially outward direction relative to a centerline reference and the second orientation is fin fold rest oriented a radially inward direction relative to a centerline reference. These orientations allow the blanks to be cut from the same fin fold material by simply rotating the cutting means. Further, the radially outward oriented blank, and its later formed heat exchanger foil, and the radially inward oriented blank, and its later formed heat exchanger foil, create sufficient points of interference when placed in opposition so as to prevent nesting of the fin fold materials during recuperator core segment operation.

Referring again to FIG. 28, in one embodiment of the invention, the next step 204 is forming the sheet to create a first manifold area having fins of a reduced fin height, the first manifold area formed adjacent a primary surface area. The primary surface area of one embodiment is formed so as to have a central portion and a first transition zone, the central portion having fins of a full fin height, the first transition zone having fins of heights greater than the reduced fin height and less than the full fin height. The first transition zone fins are formed such that each fin has heights that continuously increase from the reduced fin height to the full fin height along the fin in a direction from the first manifold area to the central portion. The plurality of the first transition zone fins are formed such that, for each fin, the fin aspect ratio is generally constant. The first transition zone fins are formed such that, for adjacent fins of the first transition zone, the fin aspect ratios continuously increase in a direction from the outer boundary to the inner boundary. In one embodiment of the invention, the fin aspect ratios are between 1:60 and 1:0.5.

Step 204 includes forming the sheet to create a second manifold zone having fins of a reduced fin height wherein the second manifold zone is adjacent the primary surface area. Step 204 further includes forming the primary surface area so as to include a second transition zone. The second transition zone is formed to have fins of heights greater than the reduced fin height and less than the full fin height and to have fin aspect ratios generally equal to a constant second transition portion fin aspect ratio. In one embodiment, the generally constant second transition portion fin aspect ratio is a constant aspect ratio between 1:2 and 1:0.5, and is more preferably 1:1.

Referring again to FIG. 28, in one preferred embodiment, the step 204 of forming the rectangular blanks includes a coining operation wherein the rectangular blanks are stamped between two opposing rigid surfaces thus crushing portions of the sheet to form a floor area and a primary surface area of a heat exchanger foil. The floor is the region of generally flattened fin folds that is peripheral to a generally rectangular primary surface area. The floor includes the inlet and outlet manifold zones on either side of the primary surface area. The primary surface area includes a central area of uncrushed fins and a transition zone of partially crushed fins, wherein the transition zone is disposed between the inlet manifold and the central area.

Step 206 includes forming an offset peripheral flange upon the periphery of the sheets. The step 206 includes placing the previously coined sheets in a second fixture wherein the offset mating flanges are pressed into the sheet. Then the rectangular sheets are trimmed to the trapezoidal shape like that seen in FIG. 3, as indicated in step 208. Step 206 further includes forming the offset peripheral flange around substantially an entire periphery of the sheet except for a location of an inlet and outlet to the inlet and outlet manifold zones. Preferably the offset peripheral flange is formed so as to have corners 162 and 164 including an indexing corner positioned upon the flange so as to indicate the selected fin orientation direction. The indexing corner has a generally curved outer profile defined by an indexing radius and the indexing radius is selected such that the indexing corner may be uniquely identified by an inspection means with respect to remaining peripheral flange corners.

Step 210 includes joining the mating surfaces together, and welding the peripheral flanges together with a peripheral weld bead.

Preferably step 210 includes superimposing the mating flanges of the two sheets and placing the two sheets in a rotatable fixture. The rotatable fixture then rotates the mated sheets while an automated welding machine places a peripheral weld bead between the mating flanges around the radial outer edge and the two manifold sides as indicated in step 212.

A peripheral edge bead is also placed along the portion of the mating flanges along radially inner edge between the inlet area and outlet area as also indicated in step 212.

Step 216 includes clamping stiffener support spacer bars in place about the mounting flange along the inner edge so that the plates are sandwiched between the spacer bars. Then, as indicated in step 218, the bars are welded together. This is accomplished with a weld bead running generally along the middle portion of the bars between the air inlet and air outlet, and then by welds around the air inlet and air outlet joining the bars to the sheets. As discussed in detail above, the thin and thick spacer bars 48 and 50 form an offset indexing lip on the inner edge of the recuperator core segment, that defines the proper future orientation of the recuperator core segment in the core.

Then as indicated in step 220 the air channel inserts are placed through the inlet and outlet openings between the sheets.

Then a leak test is performed on the partially assembled recuperator core segment as shown in step 222.

Next, in step 223, the weld cap is crimped in place along the outer edge to protect the weld bead there from abrasive wear against the outer casing which will ultimately be placed about the annular recuperator.

Then, in step 226, the assembled recuperator core segment 38 is molded into an involute shape. As discussed above, the curve is formed in a consistent relationship to the orientation of the offset indexing lip. Then, in step 228, the gas channel inserts 54 and 56 are attached thereto by adhesive.

Next, as indicated by steps 230 and 234, a plurality of the involute shaped recuperator core segments 38 are placed in a fixture and joined to form a sector of the recuperator core as shown in FIG. 26.

As previously described with regard to FIGS. 23 and 24, if a defectively oriented recuperator core segment has been placed in the sector assembly, it will be detected at this point and replaced.

Then as indicated in step 236 a plurality of the sectors are placed in fixture. In one embodiment of the invention, ten sectors are placed in the fixture according to step 236.

Then as indicated in step 250 and 252, and illustrated in FIG. 27, an inner case 233 is closely slid in place within the recuperator core and is located between the array of inlet areas and the array of outlet areas, and is then welded in place with welds 240 and 242.

Then as indicated in step 254 in a similar fashion first and second interface rings 224 and 246 are welded in place on the extensions of the spacer support stiffener bars.

Then as indicated in step 256 an outer case 248 is placed in a slight friction fit engagement with the radially outer extremities of each recuperator core segment, with the case engaging the weld caps 52. Then a final leak test is conducted as indicated at step 258.

The manufacturing process just described provides the means for manufacturing the improved recuperator core segment having the transition zones which permit the relatively large radial width to axial length ratio while still achieving relatively uniform distribution of air flow through the recuperator core segment so that the recuperator core segment functions efficiently.

The methods of construction have provided numerous improved features which aid in the consistent manufacture of properly oriented components for the recuperator core segments and properly oriented recuperator core segments within the recuperator core, so as to minimize product failures which can occur due to improper assemblies where like oriented fin fold plates are placed adjacent each other and create nesting of fin folds which can lead to product failure.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those in the art, which changes are encompassed within the scope and spirit of the present invention as defined by the appended claims.

What is claimed is:

1. A recuperator assembly, comprising:

a plurality of involute curved recuperator core segments, each recuperator core segment comprising:

first and second heat exchanger foils disposed in opposition so as to define an internal air passage, said internal air passage providing fluid communication between a recuperator core segment inlet and a recuperator core segment outlet, said recuperator core segment inlet and recuperator core segment outlet disposed between said heat exchanger foils along a radially inner edge, each heat exchanger foil having:

an integrally formed offset peripheral mating flange, the flanges of the first and second heat exchanger foils being mated together; and an exterior heat exchange surface having a primary surface zone including exterior corrugations, said exterior corrugations having a generally uniform height above said peripheral mating flange, said height being a profile height; and first and a second stiffener support spacer bars engaging a portion of said peripheral mating flanges of said first and second heat exchanger foils along said inner edge, respectively, the peripheral mating flanges being sandwiched between the stiffener support spacer bars, wherein, said first stiffener support spacer bar has a height being a first indexing height and said second stiffener support spacer bar has a height being a second indexing height, said first indexing height being less than the profile height of said first heat exchanger foil, and said second indexing height being greater than the profile height of said second heat exchanger foil, wherein, the exterior heat exchange surface of one of said first and second heat exchanger foils is convexly curved and the exterior heat exchange surface of the other of said first and second heat exchanger foils is concavely curved, and wherein, at least a pair of said plurality of recuperator core segments are adjacently stacked in a nested configuration so as to form at least one recuperator core sector.

2. The apparatus of claim 1, wherein, for at least one pair of recuperator core segments adjacently stacked in a nested configuration, said pair of recuperator core segments are disposed such that the convexly curved exterior surface of one recuperator core segment is received by the concavely curved exterior surface of the other recuperator core segment, and such that the second stiffener support spacer bar of one recuperator core segment is adjacently disposed along the first stiffener support spacer bar of the other recuperator core segment.

3. The apparatus of claim 2, further comprising:

a thermal expansion gap disposed between said adjacently disposed first and second stiffener support spacer bars of at least one pair of recuperator core segments adjacently stacked in a nested configuration; and weld beads disposed within a radially inner portion of said thermal expansion gap such that a radially outer portion of said gap remains void, wherein, said the convexly curved exterior surface of said one recuperator core segment and the concavely curved exterior surface of said other recuperator core segment define an exterior gas passage between the recuperator core segments, said first and second stiffener support spacer bars and said weld beads defining an inner radial wall of said exterior gas passage.

4. The apparatus of claim 1, further comprising:

at least a pair of recuperator core sectors disposed so as to form an annular recuperator core.

5. The apparatus of claim 1, wherein:

the first stiffener support spacer bar of each heat exchanger foil, and the associated exterior corrugations of its primary surface zone define a notch due to the first indexing height being less than the profile height; and said nested configuration of said adjacently stacked pair of recuperator core segments comprises the second stiffener support spacer bar of one of said recuperator core segments being received adjacent the first stiffener support spacer bar of the other of said recuperator core segments in said notch.

6. A recuperator for a gas turbine engine, comprising:

a plurality of cells disposed in juxtaposed relation to one another in an annular array, each of said cells comprising:

a first plate having spaced integral ribs thereon at least partially defining a plurality of spaced high pressure air channels; and a second plate welded to said first plate and having a plurality of spaced integral ribs which, in combination with the first plate of an adjacent cell, define a plurality of low pressure exhaust gas channels;

a first extended spacer bar on the radially inner edge of said first plate, the first spacer bar having a height less than the ribs on the first plate; and a second extended spacer bar on the radially inner edge of said second plate, the second spacer bar having a height greater than the ribs on said second plate, wherein said first and second extended spacer bars extend beyond said cell; and wherein, said first and second extended spacer bars provide an offset indexing lip along the radially inner edge of the cell.

7. A method of manufacturing a recuperator cell:

providing a first plate having spaced integral ribs thereon at least partially defining a plurality of spaced high pressure air channels;

providing a second plate welded to said first plate and having a plurality of spaced integral ribs which, in combination with the first plate of an adjacent cell, define a plurality of low pressure exhaust gas channels;

attaching a first spacer bar on the radially inner edge of said first plate, the first spacer bar having a height less than the ribs on the first plate;

attaching a second spacer bar on the radially inner edge of said second plate, the second spacer bar having a height greater than the ribs on said second plate; and wherein, said first and second spacer bars provide an offset indexing lip along the radially inner edge of the cell.

8. The method of claim 7, further comprising:

forming each of a plurality of such cells into an involute curve, the curve being oriented the same relative to said offset indexing lip for each of said cells;

stacking said plurality of involute shape cells with their offset indexing lips nested with each other; and joining said cells together.

* * * * *